(12) United States Patent
Johnson et al.

(10) Patent No.: US 10,905,976 B2
(45) Date of Patent: Feb. 2, 2021

(54) FILTER SYSTEMS AND RELATED METHODS

(71) Applicants: Valdean Allen Johnson, Herriman, UT (US); Celia Roberts Johnson, Herriman, UT (US)

(72) Inventors: Valdean Allen Johnson, Herriman, UT (US); Celia Roberts Johnson, Herriman, UT (US)

(73) Assignee: WellspringPure, LLC, Eagle Mountain, UT (US)

(*) Notice: Subject to any disclaimer, the term of this patent is extended or adjusted under 35 U.S.C. 154(b) by 337 days.

(21) Appl. No.: 15/942,081

(22) Filed: Mar. 30, 2018

(65) Prior Publication Data

US 2018/0280838 A1    Oct. 4, 2018

Related U.S. Application Data

(60) Provisional application No. 62/540,062, filed on Aug. 2, 2017, provisional application No. 62/480,776, filed on Apr. 3, 2017.

(51) Int. Cl.
*B01D 21/30* (2006.01)
*B01D 21/00* (2006.01)
*C02F 1/00* (2006.01)

(52) U.S. Cl.
CPC ....... *B01D 21/307* (2013.01); *B01D 21/0012* (2013.01); *C02F 1/001* (2013.01); *C02F 2201/005* (2013.01); *C02F 2209/40* (2013.01); *C02F 2307/10* (2013.01)

(58) Field of Classification Search
None
See application file for complete search history.

(56) References Cited

U.S. PATENT DOCUMENTS

| 195,423 | A | * | 9/1877 | Vent | ................... | B01D 17/0214 |
| | | | | | | 210/109 |
| 224,680 | A | * | 2/1880 | Green | ....................... | C02F 1/04 |
| | | | | | | 210/262 |
| 316,885 | A | * | 4/1885 | Dumont | ............... | B01D 24/004 |
| | | | | | | 210/284 |
| 498,967 | A | * | 6/1893 | Benham | .................. | C02F 1/003 |
| | | | | | | 210/244 |
| 537,489 | A | * | 4/1895 | Sherwood | .............. | B01D 27/02 |
| | | | | | | 210/290 |
| 541,970 | A | * | 7/1895 | Harder | .................... | C02F 1/001 |
| | | | | | | 210/314 |

(Continued)

OTHER PUBLICATIONS

Berkey Filters, published online at least as early as Mar. 1, 2017 at 911water.com.

*Primary Examiner* — Robert J Popovics
(74) *Attorney, Agent, or Firm* — Law Office of Paul B. Johnson; Paul B. Johnson

(57) ABSTRACT

Disclosed herein is a method of controlling the water flow in a water filtration system in which the filtering system may be connected to a variety of possible outside sources and pre-filtering systems, in order to ensure a continuous flow of water, eliminating the need of continual user surveillance. A combination of float valves and seals regulate water levels and prevent leakage and overflow. Ambient pressure is maintained by venting a lower chamber. Additional chamber(s) may be integrated to expand the capacity of the system.

4 Claims, 19 Drawing Sheets

(56) References Cited

U.S. PATENT DOCUMENTS

| | | | | |
|---|---|---|---|---|
| 582,403 A * | 5/1897 | Stifel | A61M 1/3633 | 210/257.1 |
| 582,440 A * | 5/1897 | Stifel | A61M 1/3633 | 210/257.1 |
| 590,020 A * | 9/1897 | Myers | B01D 17/0208 | 210/265 |
| 611,691 A * | 10/1898 | Langdon | B01D 29/15 | 210/323.2 |
| 620,621 A * | 3/1899 | Veazie | A47J 43/24 | 210/250 |
| 636,447 A * | 11/1899 | Paddock | B01D 24/46 | 210/264 |
| 648,904 A * | 5/1900 | Hart | F25D 31/002 | 62/319 |
| 673,722 A * | 5/1901 | Moulton | C02F 1/003 | 210/266 |
| 826,654 A * | 7/1906 | Firth | 210/129 | |
| 889,988 A * | 6/1908 | Thompson | B01D 21/26 | 210/257.1 |
| 967,905 A * | 8/1910 | Hagg | B01D 17/045 | 210/301 |
| 1,009,437 A * | 11/1911 | Patnaude | 62/397 | |
| 1,052,440 A * | 2/1913 | Hagg | B01D 37/025 | 210/209 |
| 1,084,030 A * | 1/1914 | Ramsey | B01D 35/153 | 210/234 |
| 1,157,776 A * | 10/1915 | Hagg | C02F 1/003 | 210/457 |
| 1,157,927 A * | 10/1915 | Davis | F25D 31/002 | 62/319 |
| 1,284,233 A * | 11/1918 | Caen | B01D 29/15 | 210/323.1 |
| 1,378,274 A * | 5/1921 | Probst | B01D 24/04 | 210/806 |
| 1,432,522 A * | 10/1922 | Barnes | F25D 7/00 | 62/311 |
| 1,433,357 A * | 10/1922 | Ellis | B01D 24/12 | 210/125 |
| 1,521,100 A * | 12/1924 | House | C02F 1/003 | 210/266 |
| 1,547,855 A * | 7/1925 | Burson | C02F 1/00 | 210/239 |
| 1,579,158 A * | 3/1926 | Smilie | C02F 1/003 | 210/436 |
| 1,621,684 A * | 3/1927 | Rabjohn | B01D 24/24 | 210/266 |
| 1,628,510 A * | 5/1927 | Perry | C02F 9/00 | 210/202 |
| 1,629,269 A * | 5/1927 | Hagg | C02F 1/003 | 210/282 |
| 1,645,712 A * | 10/1927 | Meyers | C02F 1/001 | 210/265 |
| 1,674,203 A * | 6/1928 | Holz | C02F 1/283 | 210/266 |
| 1,696,487 A * | 12/1928 | Jervis | C02F 1/001 | 210/472 |
| 1,723,564 A * | 8/1929 | Lewis | C02F 1/003 | 210/282 |
| 1,728,646 A * | 9/1929 | Washburne | B67D 3/00 | 62/171 |
| 1,752,060 A * | 3/1930 | Burright | C02F 1/004 | 210/261 |
| 1,918,446 A * | 7/1933 | Barnes | C02F 1/001 | 210/125 |
| 2,239,612 A * | 4/1941 | Lawlor | C02F 1/645 | 210/117 |
| 2,335,458 A * | 11/1943 | Senyal | C02F 1/003 | 210/257.1 |
| 2,533,930 A * | 12/1950 | Harr | B67D 3/0022 | 222/57 |
| 2,604,991 A * | 7/1952 | Rogers | C02F 9/005 | 210/206 |
| 3,334,044 A * | 8/1967 | Satterlee | C02F 1/42 | 210/662 |
| 3,339,743 A * | 9/1967 | Bealle | B01J 47/012 | 210/256 |
| 3,392,837 A * | 7/1968 | Sanzenbacher | C02F 1/003 | 210/282 |
| 3,430,769 A * | 3/1969 | Sanzenbacher | C02F 1/003 | 210/266 |
| 4,749,484 A * | 6/1988 | Greenhut | B01D 36/001 | 210/266 |
| 4,800,018 A * | 1/1989 | Moser | C02F 1/003 | 210/266 |
| 4,946,600 A * | 8/1990 | Shin | B01D 24/40 | 210/758 |
| 4,978,449 A * | 12/1990 | Devine | C02F 1/003 | 210/264 |
| 5,032,261 A * | 7/1991 | Pyper | B01D 36/001 | 210/137 |
| 5,110,482 A * | 5/1992 | Shin | B01D 24/48 | 210/758 |
| 5,128,036 A * | 7/1992 | Svensson | C02F 1/003 | 210/264 |
| 5,173,192 A * | 12/1992 | Shalev | B01D 35/04 | 210/244 |
| 5,223,132 A * | 6/1993 | Yoon | B01D 61/08 | 210/232 |
| 5,264,129 A * | 11/1993 | Simpson | C02F 3/10 | 210/611 |
| 5,290,442 A * | 3/1994 | Clack | C02F 9/005 | 210/257.1 |
| 5,322,625 A * | 6/1994 | Rise | B01D 24/04 | 210/238 |
| 5,383,601 A * | 1/1995 | Astle | A01G 27/003 | 239/276 |
| 5,454,944 A * | 10/1995 | Clack | C02F 9/005 | 210/257.1 |
| 5,560,393 A * | 10/1996 | Clack | B67D 3/0009 | 137/562 |
| 5,562,824 A * | 10/1996 | Magnusson | C02F 1/003 | 210/266 |
| 5,616,243 A * | 4/1997 | Levy | A23L 2/72 | 210/282 |
| 5,928,506 A * | 7/1999 | Bae | C02F 1/003 | 210/94 |
| 5,993,672 A * | 11/1999 | Manz | B01D 24/4694 | 210/744 |
| 6,013,180 A * | 1/2000 | Wang | C02F 1/003 | 210/232 |
| 6,123,858 A * | 9/2000 | Manz | B01D 24/46 | 210/744 |
| 6,129,841 A * | 10/2000 | Dann | C02F 1/003 | 210/244 |
| 6,139,726 A * | 10/2000 | Greene | C02F 9/005 | 210/175 |
| 6,248,244 B1* | 6/2001 | Dann | C02F 1/003 | 210/764 |
| 6,419,821 B1* | 7/2002 | Gadgil | B01D 39/2068 | 210/109 |
| 6,516,562 B2* | 2/2003 | Astle | A01G 27/00 | 47/48.5 |
| 6,524,477 B1* | 2/2003 | Hughes | C02F 1/003 | 210/282 |
| 6,602,410 B1* | 8/2003 | Tanner | C02F 1/003 | 210/201 |
| 6,602,425 B2* | 8/2003 | Gadgil | B01D 39/2068 | 210/744 |
| 6,648,174 B2* | 11/2003 | Greene | B67D 1/00 | 222/146.6 |
| 6,716,343 B2* | 4/2004 | Kool | B01D 29/96 | 210/175 |
| 6,736,298 B2* | 5/2004 | Busick | B01D 35/143 | 222/146.1 |
| 6,764,594 B2* | 7/2004 | Lee | A47J 31/605 | 210/104 |
| 6,966,980 B2* | 11/2005 | Blackburn | B01D 24/4861 | 210/90 |

(56) References Cited

U.S. PATENT DOCUMENTS

| | | | | |
|---|---|---|---|---|
| 7,002,161 | B2* | 2/2006 | Greene | C02F 1/008 210/94 |
| 7,014,759 | B2* | 3/2006 | Radford | C02F 1/003 141/330 |
| 7,018,528 | B2* | 3/2006 | Lee | B01D 17/00 210/167.29 |
| 7,175,760 | B2* | 2/2007 | Cary | C02F 1/006 210/123 |
| 7,306,723 | B2* | 12/2007 | Radford | C02F 1/003 141/330 |
| 7,438,799 | B2* | 10/2008 | Vandenbelt | C02F 1/003 210/85 |
| 7,874,325 | B2* | 1/2011 | Tyler | B67D 3/0038 141/309 |
| 8,043,502 | B2* | 10/2011 | Nauta | C02F 1/003 210/232 |
| 8,128,820 | B2* | 3/2012 | Wu | C02F 1/003 210/251 |
| 8,177,966 | B2* | 5/2012 | Wu | C02F 1/003 210/88 |
| 8,216,465 | B2* | 7/2012 | Nauta | C02F 1/003 210/232 |
| 8,313,644 | B2* | 11/2012 | Harris | C02F 1/002 210/198.1 |
| 9,193,605 | B2* | 11/2015 | Minton-Edison | C02F 1/281 |
| 9,199,859 | B2* | 12/2015 | Spittle | C02F 1/66 |
| 9,352,252 | B2* | 5/2016 | Vestergaard Frandsen | C02F 1/003 |
| 9,352,979 | B2* | 5/2016 | Kuennen | C02F 1/281 |
| 9,975,068 | B1* | 5/2018 | Maresh | B01D 24/10 |
| 10,336,639 | B2* | 7/2019 | Kuennen | C02F 1/76 |
| 10,589,199 | B2* | 3/2020 | See | C02F 1/001 |
| 10,589,200 | B1* | 3/2020 | Maresh | B01D 29/605 |
| 10,647,592 | B2* | 5/2020 | Geelhood | C02F 1/003 |
| 2006/0144781 | A1* | 7/2006 | Carlson | C02F 1/003 210/459 |
| 2011/0303589 | A1* | 12/2011 | Kuennen | C02F 1/281 210/95 |
| 2012/0267314 | A1* | 10/2012 | Minton-Edison | C02F 1/281 210/695 |
| 2014/0144829 | A1* | 5/2014 | Takeda | C02F 1/003 210/295 |
| 2014/0216993 | A1* | 8/2014 | Pradeep | B01D 29/00 210/85 |
| 2014/0342041 | A1* | 11/2014 | Mullins | C02F 1/001 426/66 |
| 2016/0114271 | A1* | 4/2016 | Michaud | C02F 1/003 210/807 |
| 2016/0236958 | A1* | 8/2016 | Kuennen | C02F 1/283 |
| 2018/0154290 | A1* | 6/2018 | See | B01D 39/163 |
| 2018/0280838 | A1* | 10/2018 | Johnson | B01D 21/307 |
| 2020/0071189 | A1* | 3/2020 | Geelhood | C02F 1/003 |
| 2020/0215463 | A1* | 7/2020 | Johnson | B01D 37/045 |

\* cited by examiner

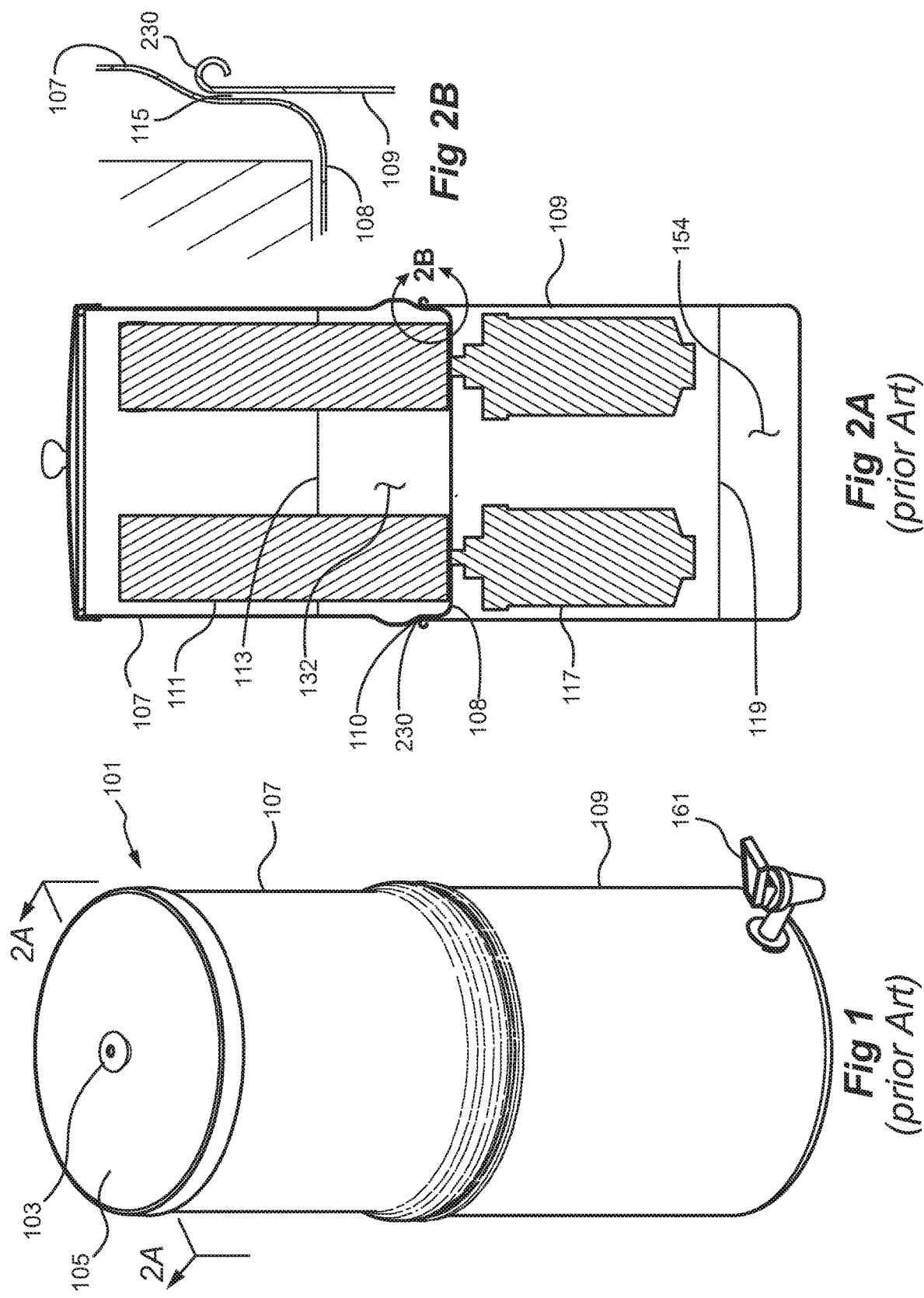

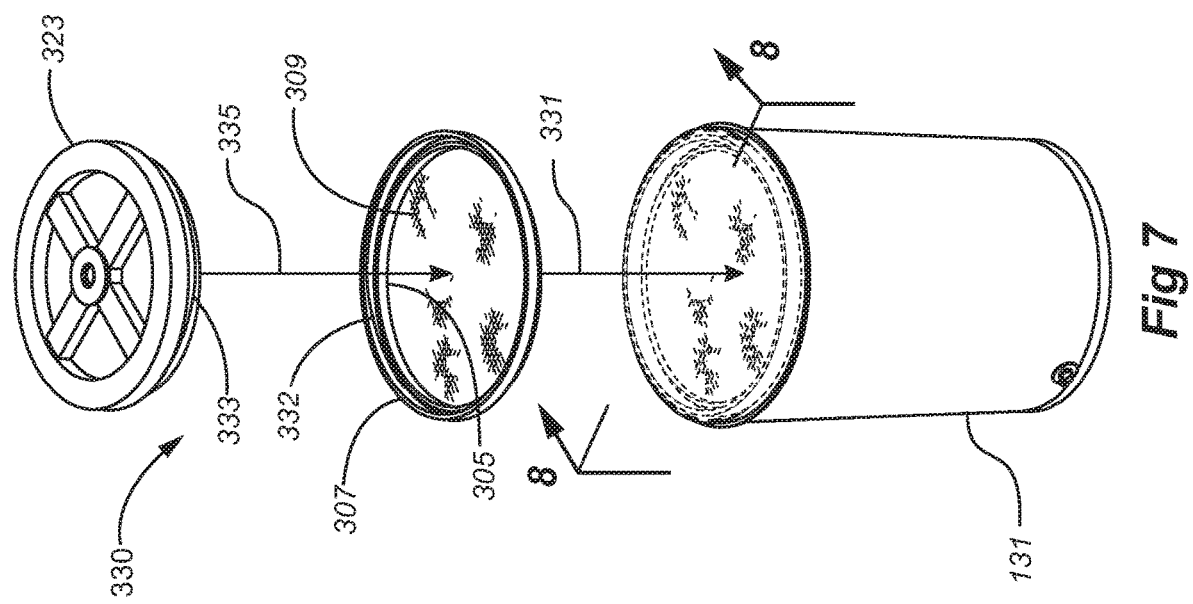

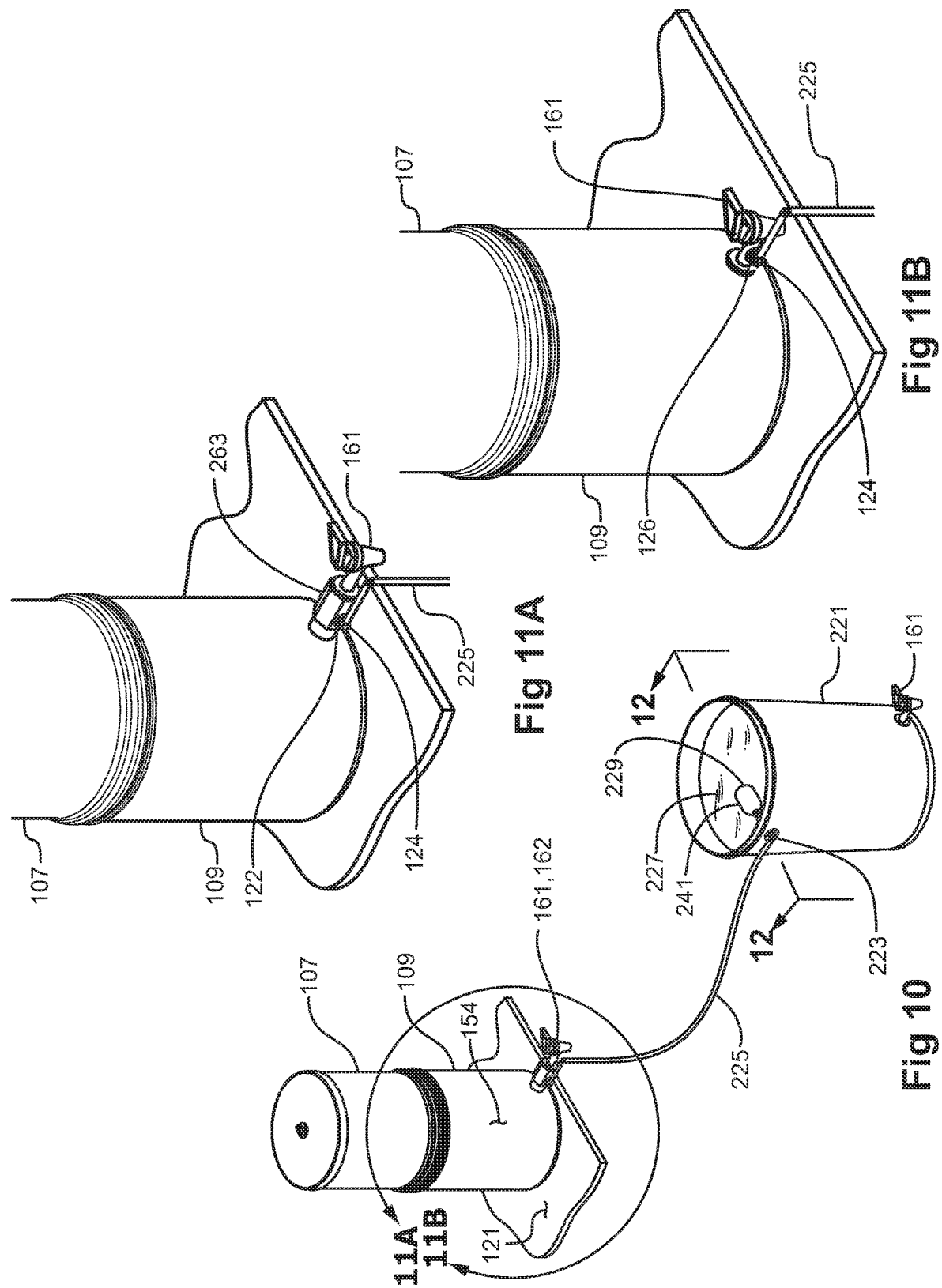

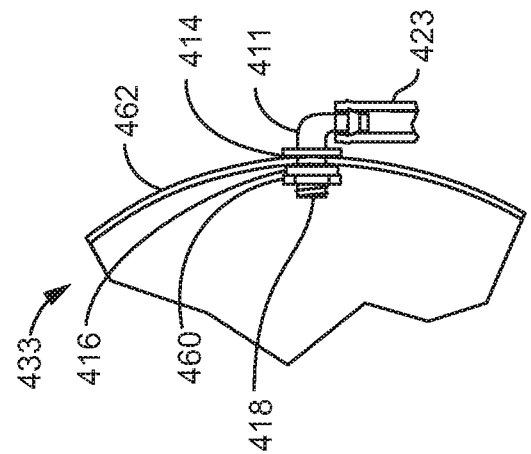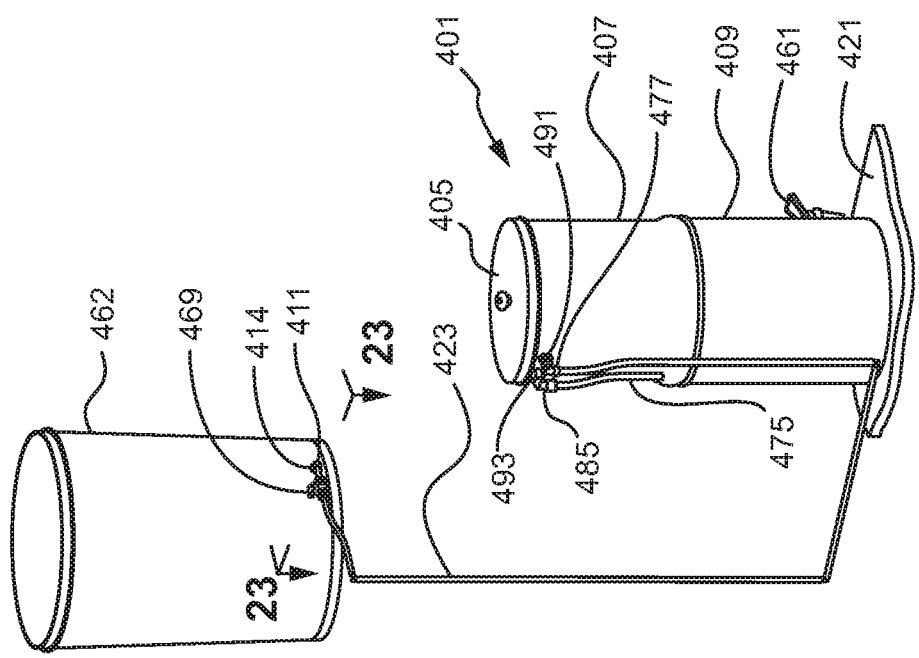

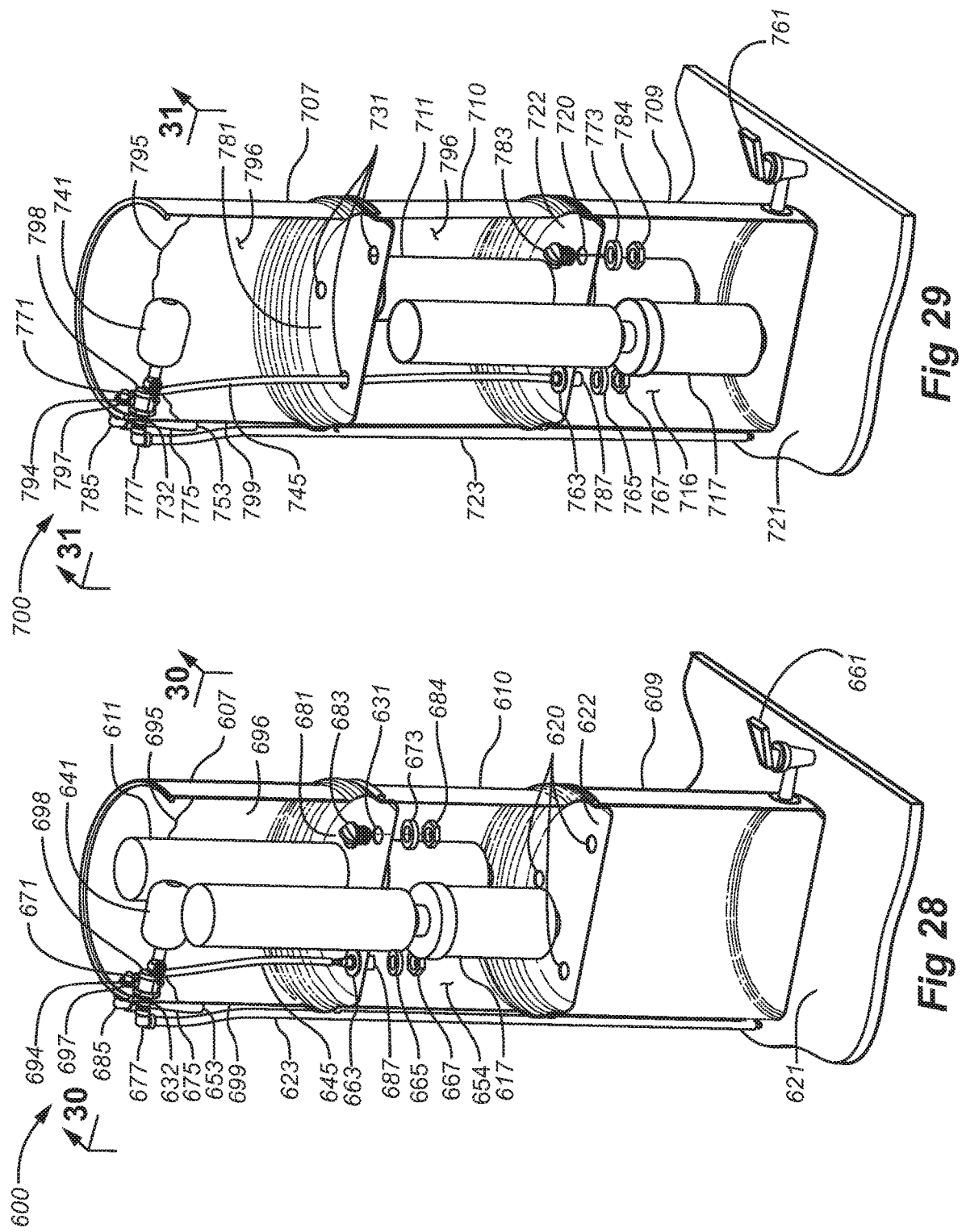

FILTER SYSTEMS AND RELATED METHODS

CROSS REFERENCE TO RELATED APPLICATIONS

This document claims the benefit of the filing date of U.S. Provisional Patent Application No. 62/480,776, entitled "Method of providing continual access and flow of water to, through and from a water filter system," naming as first inventor Valdean Allen Johnson, which was filed on Apr. 3, 2017, and also claims the benefit of the filing date of U.S. Provisional Patent Application No. 62/540,062, entitled "Method of creating a protection against overflow of a water filter system," naming as first inventor Valdean Allen Johnson, which was filed on Aug. 2, 2017, the disclosures of each of which are hereby incorporated entirely herein by reference.

BACKGROUND

1. Technical Field

Aspects of this document relate generally to filters for liquids.

2. Background Art

Gravity flow culinary water filters have serious drawbacks in their current design. The current filters are designed to have the user remove the lid from the device and pour unfiltered water into the upper chamber. Over the course of time, the water then leaves the upper chamber and flows through the purifying filters, finally accumulating into the lower chamber. The time required for the water to pass through the filter(s) is generally rather lengthy, thus requiring the user to wait for an inconvenient amount of time for the water to be purified. These chambers are often opaque, many of them being made of metal. The user is left not knowing how much water is purified and ready for use. Even if the lower chamber is opened to reveal the amount of water it contains, it is still ambiguous how much water can be poured into the upper chamber for the intent of being processed.

The upper chamber will continue to feed the lower chamber until the upper chamber runs out of water. Because the lower chamber is not sealed in the current filter systems, there is always a risk of water overflowing the top of the lower chamber and flooding the area surrounding the filter. The user is therefore tasked with continually guessing when and how much water can be poured into the upper chamber without overfilling.

The current simplest way to avoid overfilling is to wait until the lower chamber is emptied out before filling the upper chamber. Then the user must wait until the water that he/she added to the upper chamber filters down to the lower chamber often requiring hours for the desired purified water to be available.

SUMMARY

This invention provides for a regulated, continuous flow of water to a water filter system in order to eliminate the need for the user to monitor the water levels of both the upper and lower chambers without concern for flooding, and to have purified water available without having to wait.

This can be accomplished by:

1) Introducing water, which may be pre-filtered, into the upper chamber from a variety of possible sources outside the existing chambers, via a float valve, which controls the amount of water allowed into the upper chamber to prevent it from overflowing, while providing a continuous access to water.

2) Controlling the flow of water into the lower chamber to prevent spillage by either (A) providing a seal for the lower chamber that can easily be installed by either the manufacturer or by the user or (B) providing a float valve mechanism in the lower chamber that prevents overfilling of the lower chamber. If the lower chamber is to be sealed then a vent may be provided that allows the air and water to fluctuate in the lower chamber, venting the excess into and out of the airspace above the maximum water level of the upper chamber, and maintaining the ambient pressure of the lower chamber to avoid creating a vacuum.

3) Allowing the user to connect the incoming water either to a culinary or non-culinary water line if available, or to connect to a separate off-grid water container in the event that a pressurized water line is not available, thus increasing the effective continuous water filtering capacity of the existing filtering system.

4) Providing an optional means of feeding the purified water from the lower chamber to a holding tank with potentially greater capacity than the lower chamber would normally allow for.

5) Providing any number of additional integrated chambers that may be stackable, and may integrate with existing filtering chambers, to increase storage capacity of purified or unpurified water.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 1 is a perspective view of a traditional gravity fed water filter system;

FIG. 2A is a section view of the system of FIG. 1;

FIG. 2B is a detail of FIG. 2A showing an interface between an upper and lower chamber of the system of FIG. 1;

FIG. 5 is a top view of a pre-filter membrane at an exit port of an off-grid water source container;

FIG. 6 is a top view of an alternate embodiment of a three-stage membrane pre-filter at an exit port of an off-grid water source container;

FIG. 7 is a perspective view of an off-grid water source container, lid, and lid ring membrane;

FIG. 10 is a perspective view of a gravity fed water filter system connected to a secondary purified water reservoir;

FIG. 11A is a detail perspective of the gravity fed water filter system of FIG. 10 with a diverting adapter;

FIG. 11B is a detail perspective of the gravity fed water filter system of FIG. 10 with a diverting port built into a spout instead of a diverting adapter;

FIG. 22 is a perspective view of a gravity fed water filter system connecting an off-grid water container through a sidewall of an upper chamber of the system;

FIG. 23 is a section view of the off-grid water container of FIG. 22;

FIG. 28 is a perspective section view of a gravity fed water filter system including a mid-chamber of purified water;

FIG. 29 is a perspective section view of a gravity fed water filter system including a mid-chamber of purified water;

DESCRIPTION

Figure 4:
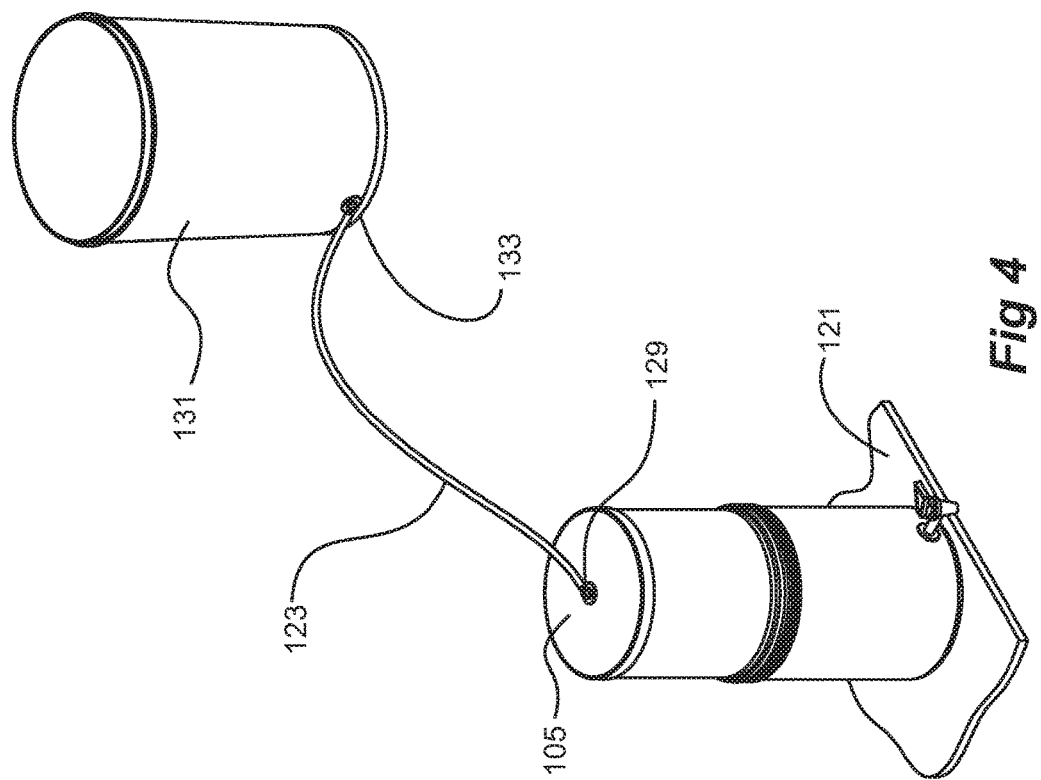
FIG. 4 is a perspective view of a gravity filter system connected to an off-grid water source.

Implementations/embodiments disclosed herein (including those not expressly discussed in detail) are not limited to the particular components or procedures described herein. Additional or alternative components, assembly procedures, and/or methods of use consistent with the intended filter systems and related methods may be utilized in any implementation. This may include any materials, components, sub-components, methods, sub-methods, steps, and so forth.

A traditional gravity fed water filter (filter) 101 as shown in FIGS. 1 and 2 includes a lid 105 and knob 103 covering an upper water chamber 107 designed to hold unpurified water 132 separated from a lower chamber 109 which is intended to contain purified water 154. Filters 111 and 117 process the unpurified water 132 and collect it as purified water 154 in chamber 109. The upper chamber 107 fits into an opening 110 in the top of the lower chamber 109, the bottom 108 of the upper chamber 107 forming the interface 115 with the upper lip 230 of the lower chamber 109.

Figure 3:
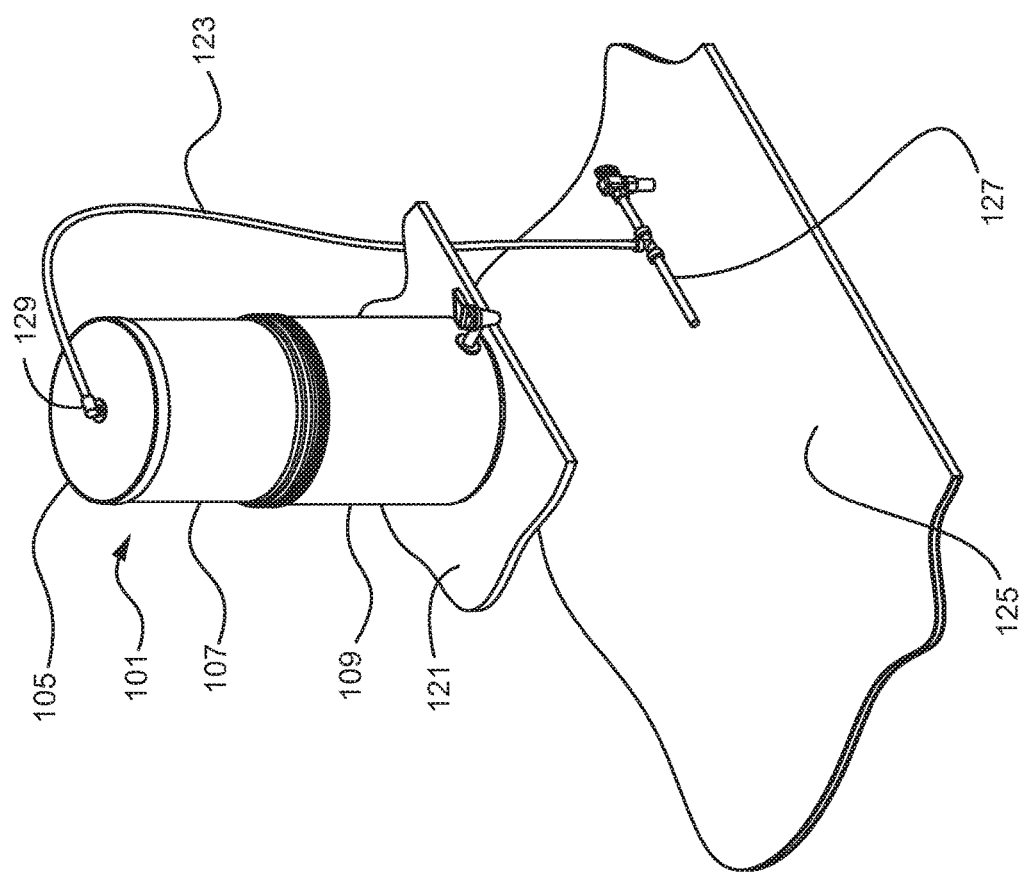
FIG. 3 is a perspective view of an implementation of a gravity filter system connected to a culinary water line.

As shown in FIG. 3, in implementations of the invention disclosed herein the traditional filter may be coupled with an external water line 123 which may connect the filter 101 to a number of water sources. The water feed line 123 may be connected from the input port 129 of the water filter upper chamber 107 to a culinary water pressure line 127.

The external water feed line 123 shown in FIG. 4 may be redirected to connect to a different water source such as but not limited to an off grid water container 131 via an outlet port 133 that is not connected to any water pressure line 127. This container 131 may use gravity to feed the water line 123 from the outlet port 133 of the off grid water container 131 by way of the water feed line 123 through the water inlet port 129 that is attached to the center of the lid 105.

FIGS. 5 and 6 show a pre-filter containment system 300 which holds and filters unpurified water 132 before it is introduced to filter 101. Unpurified water 132 may be filtered by an inline filter 297 that is connected to the water feed line 123. This pre-filter 297 may sit at the bottom of the off-grid unpurified water container and may be made of sponge material or some washable medium and may consist of layers of progressively finer pores as the water passes through it to catch first the larger contaminants and then increasingly smaller contaminants in subsequent layers. Layers may be comprised of large pore material 299, medium pore material 301 and fine pore material 303 until the water 132 exits through port 133 into the water feed line 123.

Figure 9:
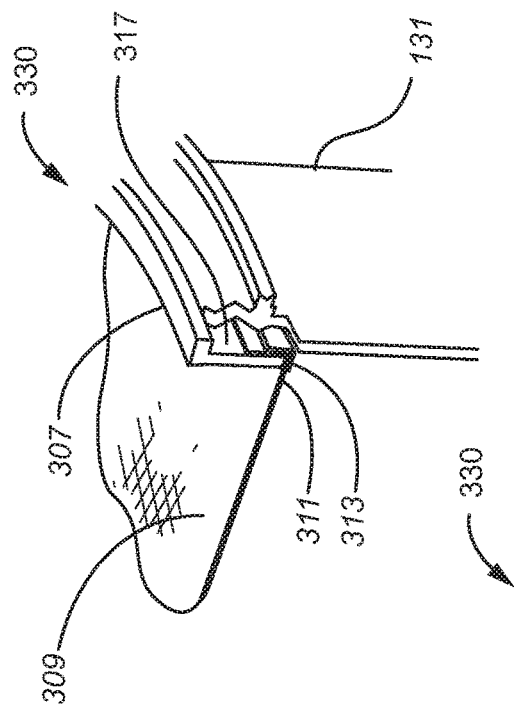
FIG. 9 is a detail view of the container of FIG. 8.
Figure 8:
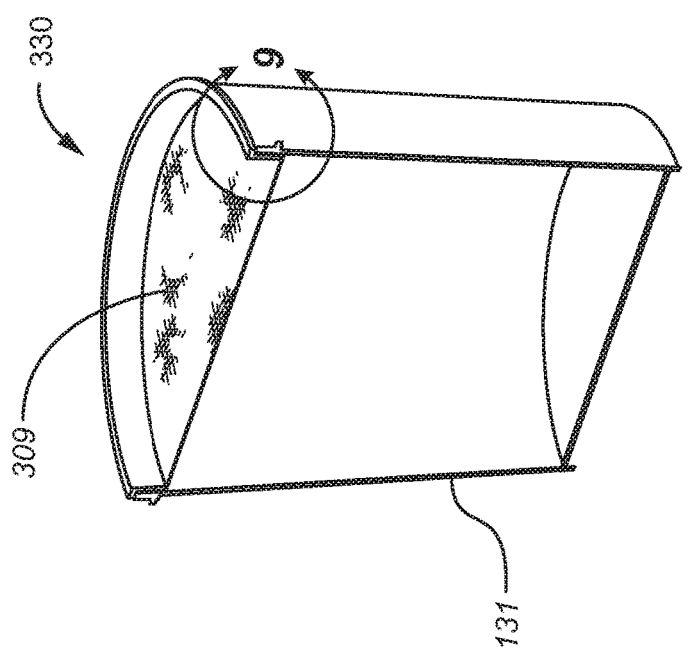
FIG. 8 is a section perspective view of the container of FIG. 7.

FIGS. 7, 8 and 9 show an additional a pre-filtering system 330 used to filter the water before it is introduced into the opening of the off grid water source container 131. This includes using a ring 307 and optionally a second retaining ring 305 to hold a filter membrane 309, as shown in FIG. 7. The edge of membrane 309 may be attached between rings 307 and 305, or the edge of membrane 309 may be held to ring 307 by attaching an adhesive strip 313 to surface 311 of membrane 309 and surface 317 of ring 307 as shown in FIG. 9.

Pre-filter assembly 330 in FIG. 7 may be inserted on top of container 131 in direction 331 and attached to top of container 131. Lid 323 may be dropped in direction 335 into the top of ring 307. The thread 333 of lid 323 should engage the thread 332 of ring 307.

Figure 12:
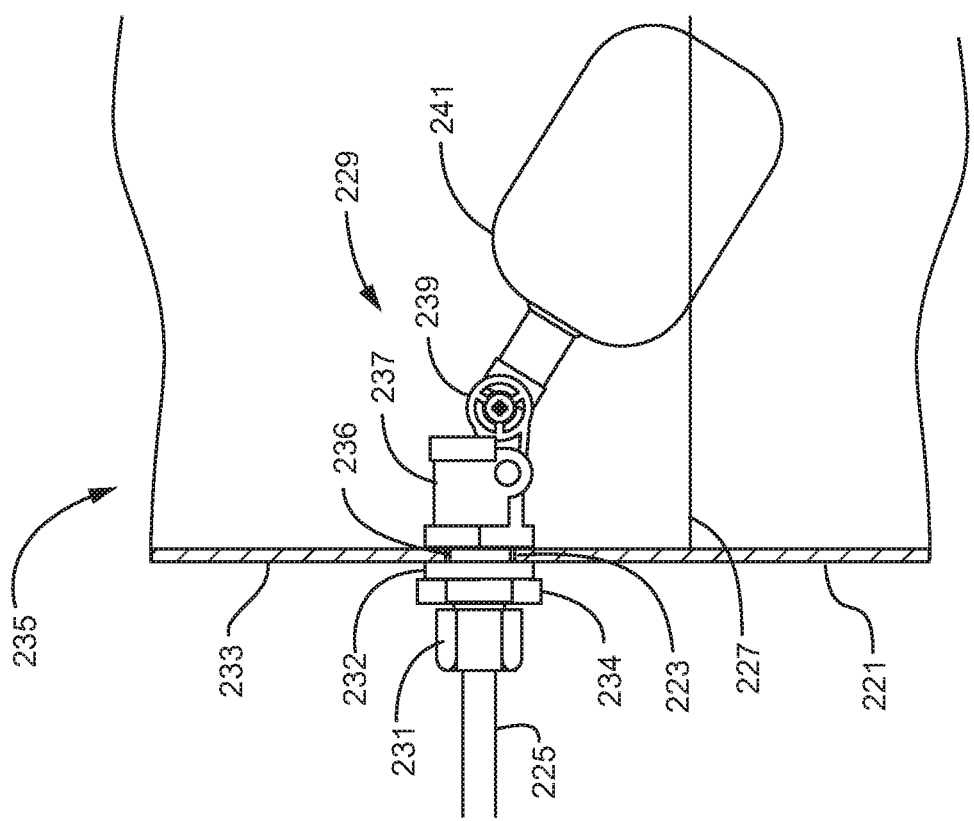
FIG. 12 is a section view of the gravity fed water filter system of FIG. 10 showing an embodiment of a float valve.

FIGS. 10, 11A, 11B and the section detail in FIG. 12 show the flow of the purified water to an external purified water storage container 221. The existing system's purified water 154 is dispensed from the lower chamber 109 through a spout 161 generally located at the bottom of lower chamber 109. Alternatively, one may route the dispensed purified water 154 from lower chamber 109 into the water output line 225 that feeds an alternate secondary water container 221 as shown in FIG. 10. To do this, the purified water 154 may exit the bottom of the lower chamber 109 and may be redirected through a diverting adapter 263 as shown in FIG. 11A. The water may then either go through the spout 161, or alternatively may exit through port 122 and fitting 124 into the purified water output line 225. FIG. 11B is similar to 11A except that a side port 126 is included in the spout itself which would connect to fitting 124 and output line 225.

The purified water 154 may go to a secondary purified water container 221, and its flow may be controlled by a secondary water storage container float valve system 235 as shown in FIG. 12. The water may go through the inlet port 223 into the float valve 229 and be dispensed by valve body 237 into the secondary storage container 221, and continue to fill the container 221 until the water level 227 engages the secondary float valve bulb 241 which rotates on valve pivot 239 until it causes valve 229 to attenuate the flow of incoming water 154 to the secondary storage container 221. The float valve 229 may be inserted through an orifice 236 in secondary storage container side wall 233 in the storage container 221. An annular seal 232 is used to seal the opening and a jam nut 234 may secure the valve 229 to the storage container 221. The purified water line 225 may be connected to the valve 229 by a fitting such as an elbow 231 or quick connect or other means.

Figure 13:
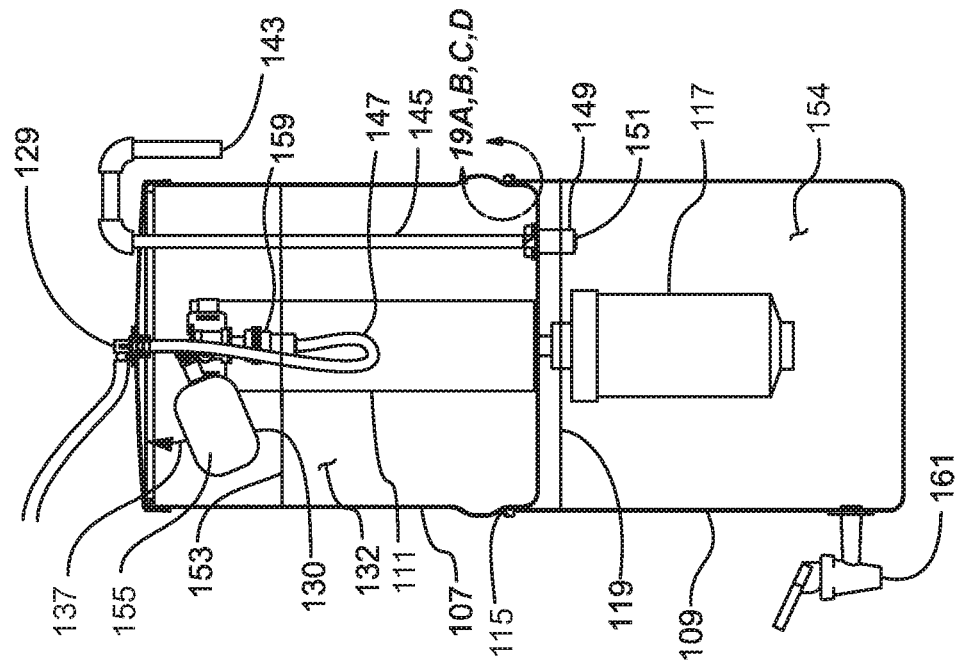
FIG. 13 is a section side view of an embodiment of a gravity filter system with an upper chamber water level below capacity.
Figure 14:
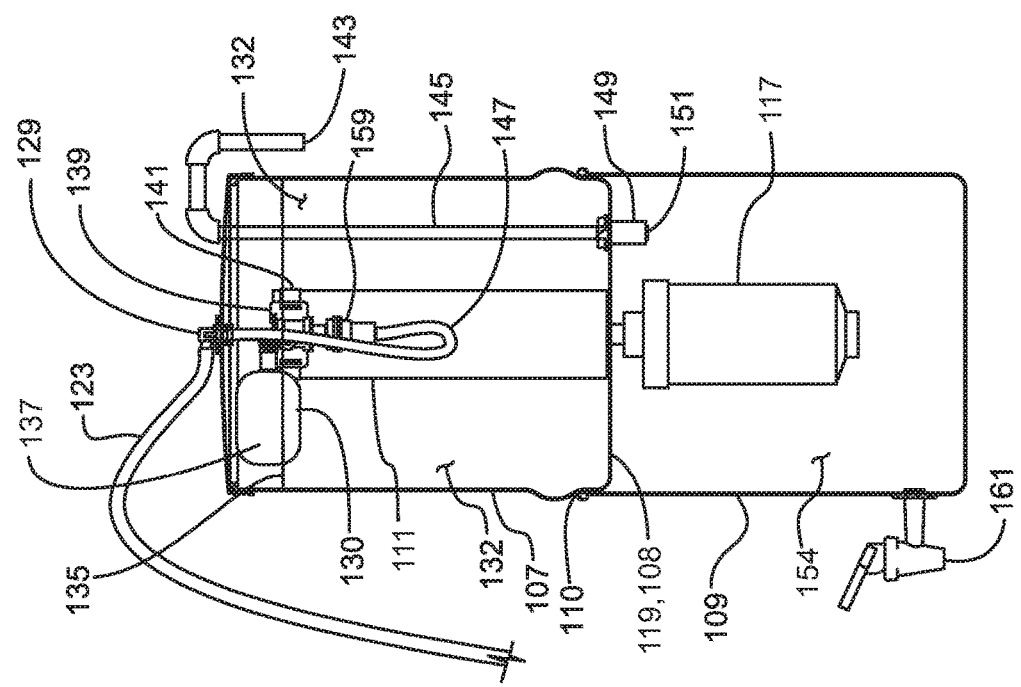
FIG. 14 is a section side view of the gravity filter system of FIG. 13 with the upper chamber water level at capacity.

The internal filtering process begins with the unpurified water flowing into upper chamber 107. FIGS. 13 and 14 show that after going through the inlet port 129 the water continues through an internal water feed line 147 and may go through a float valve adapter 159 that feeds the water into float valve 130. The valve 130 may dispense unpurified water 132 into the upper chamber 107, until the water level 153 shown in FIG. 13 rises, moving the float valve 130 from position 155 to position 137 in FIG. 14, attenuating the inflow of unpurified water 132 into upper chamber 107.

Figure 15:
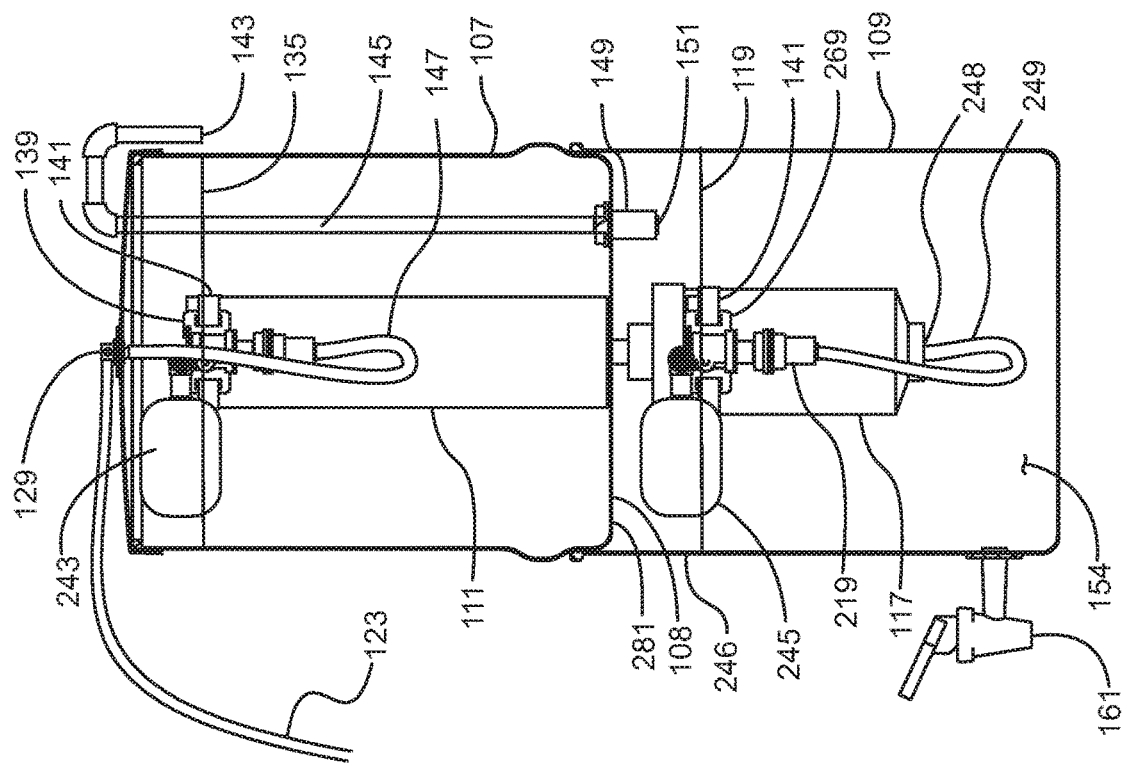
FIG. 15 is a section perspective view of an alternative embodiment of a gravity filter system including a second float valve to control a lower chamber water level.

An air vent stack 145 may be added as shown in FIGS. 13-15 to normalize the air pressure in the sealed, lower chamber 109, to allow the water level 119 to rise and fall without creating a change in vessel pressure, permitting the free flow of purified water 154 in and out of the lower chamber 109, through floor 281, as needed. The air and water can travel through the vent inlet port 151 as shown in FIG. 13 through a bulkhead fitting 149 in the lower chamber 109, up the vent stack 145 and out the vent exit 143 near the top of the upper chamber 107 shown in the same figures. The upper end of the vent must exceed the height of the maximum water level 135 of the upper chamber 107 shown in FIG. 14, thus preventing any over spill of purified water 154 due to buoyant equalization of the two chambers' water levels 119/135.

Figure 18:
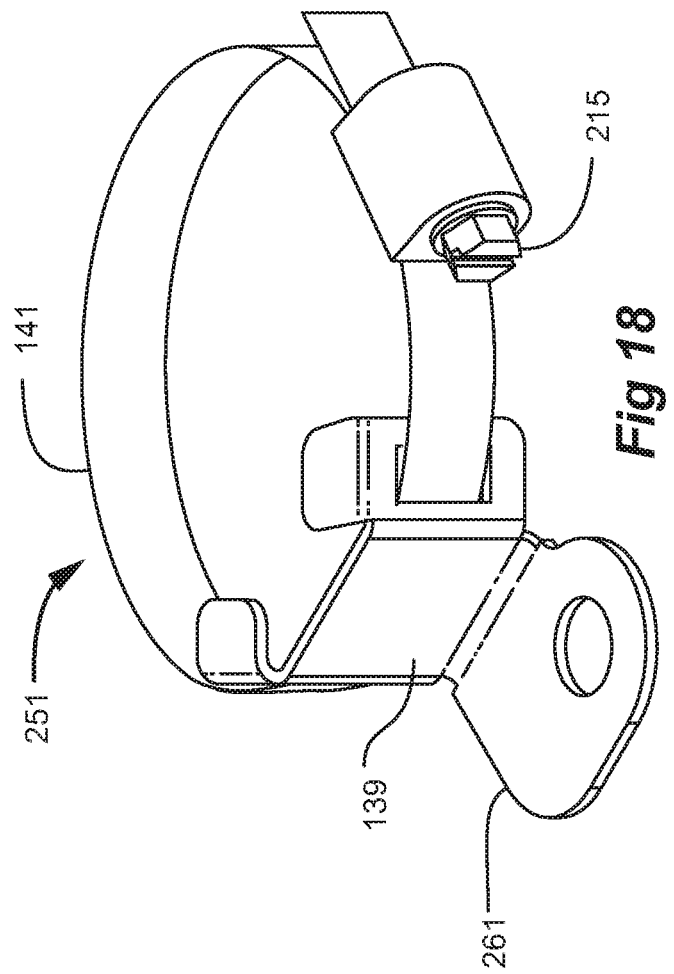
FIG. 18 is a perspective view of the float valve mounting bracket of FIG. 16 attached to a clamping band.
Figure 16:
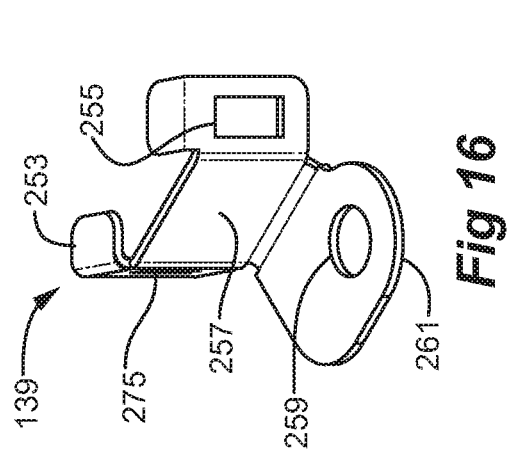
FIG. 16 is a perspective view of an upper chamber float valve mounting bracket of the system of FIG. 15.
Figure 17:
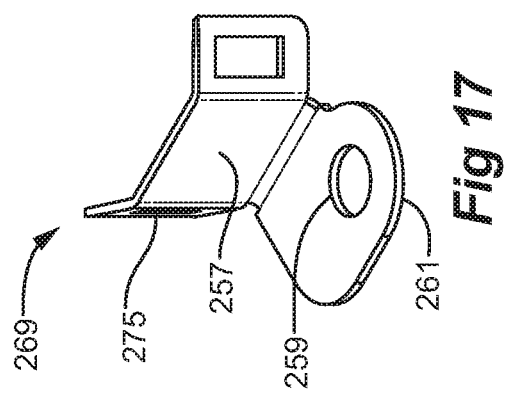
FIG. 17 is a perspective view of a lower chamber float valve mounting bracket of the system of FIG. 15.

FIG. 15 shows a float valve 243, in the upper chamber, attached to the upper filter 111 using a float vavle bracket 139. FIG. 15 also shows a second float valve 245 which may be added to the lower chamber 109 that would control the inflow of purified water 154 into the lower chamber 109. This second float valve 245 may be attached to the lower chamber filter 117 by way of a float valve bracket 269 as shown in FIG. 17, using a clamping band 141 as shown in FIG. 18. Alternatively, it may be mounted to the side wall 246 of the lower chamber 109, or to the bottom 108 of the upper chamber 107.

The purified water 154 entering the lower chamber 109 via filters 111, 117 may be directed into a second tube 249 through the output 248 of the filter cartridge 111,117. This tube 249 connects to the second float valve 245, by way of an adapter, 219, which limits the purified water 154 entering the lower chamber 109, maintaining the lower chamber water level 119 so that it would not exceed the capacity of the lower chamber 109. The unpurified water 132 which is continuously fed into the upper chamber 107 constantly flows down through the filter cartridges 111, 117 into the lower chamber 109. In other implementations the lower filter cartridge 117 may be excluded so that there is only a filter in the upper chamber—in such implementations the second float valve 245 may instead be directly connected to the bottom of the upper filter cartridge 111.

Figure 19B:
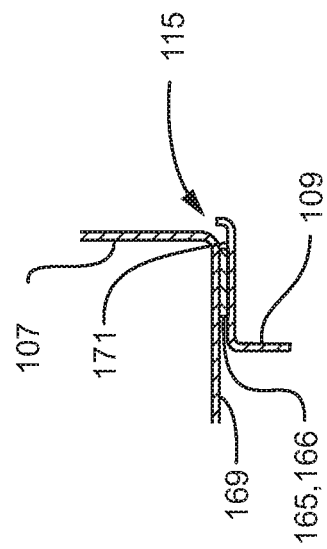
FIG. 19B is side section detail view of another implementation of a water seal between the upper and lower chambers of a gravity filter system.
Figure 19D:
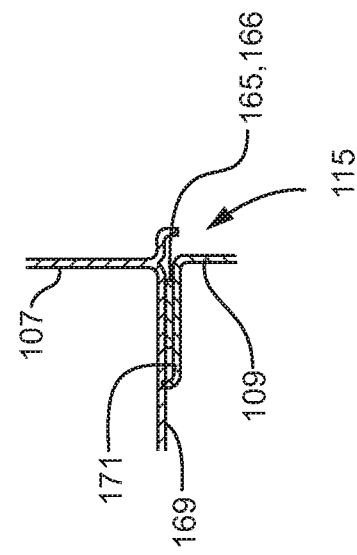
FIG. 19D is side section detail view of another implementation of a water seal between the upper and lower chambers of a gravity filter system.
Figure 19A:
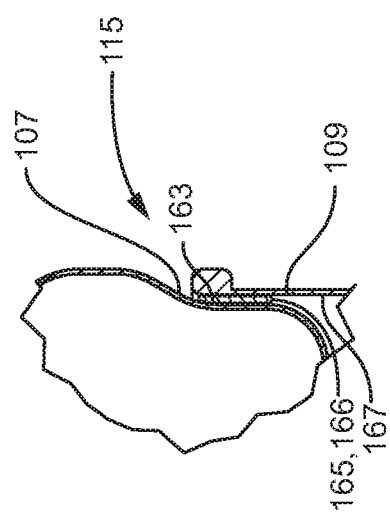
FIG. 19A is side section detail view of an implementation of a water seal between the upper and lower chambers of a gravity filter system.
Figure 19C:
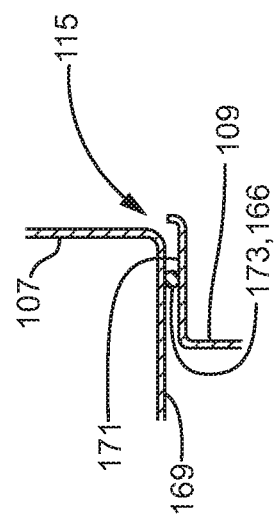
FIG. 19C is side section detail view of another implementation of a water seal between the upper and lower chambers of a gravity filter system.

FIG. 19A shows an annular seal 165 at an interface 115 between upper chamber 107 and lower chamber 109 to prevent purified water 154 from escaping through interface 115. FIGS. 19B, C and D show seal configurations that may be used to seal different prior art upper/lower chamber interfaces. FIG. 19A depicts a vertical, cylindrical interface 115 between the upper chamber 107 and the lower chamber 109, including inside surface 167 of lower chamber 109 and outside surface 163 of upper chamber 107. FIGS. 19B, C and D detail a flat horizontal interface 115 between upper chamber 107 and lower chamber 109, including the bottom surface 169 of upper chamber 107 and the upper surface 171 of lower chamber 109. The annular seal 165 may be in the form of, but not limited to, a flat gasket material 166 shown in FIGS. 19A, B and D, or an O-ring 173 as seen in FIG. 19C or other material achieving an equivalent seal.

Figure 20C:
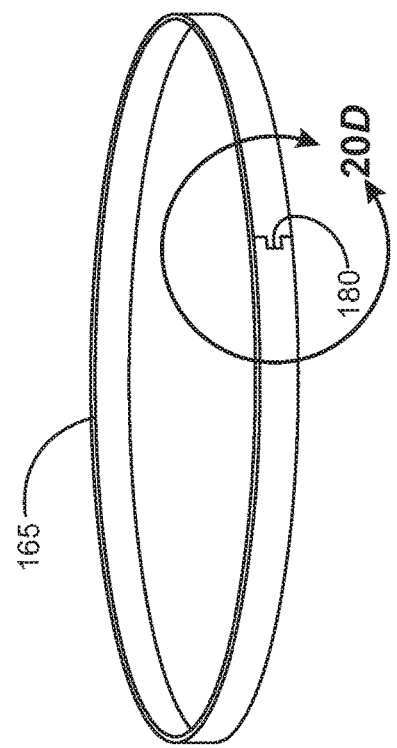
FIG. 20C is a perspective detail of the gasket seal of FIG. 20A.
Figure 20D:
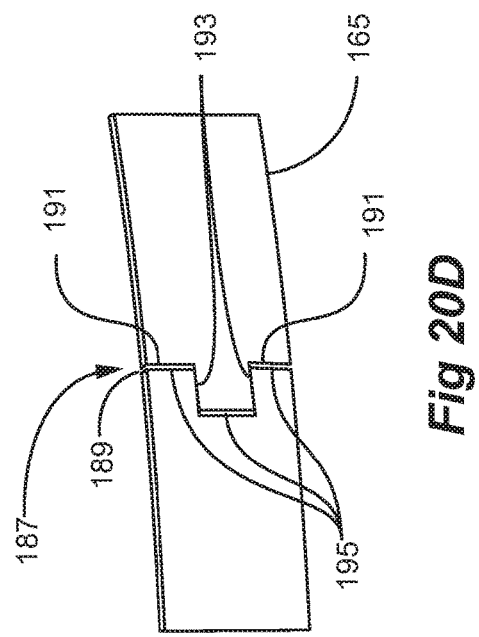
FIG. 20D is a perspective detail view of the gasket seal of FIG. 20C.
Figure 20A:
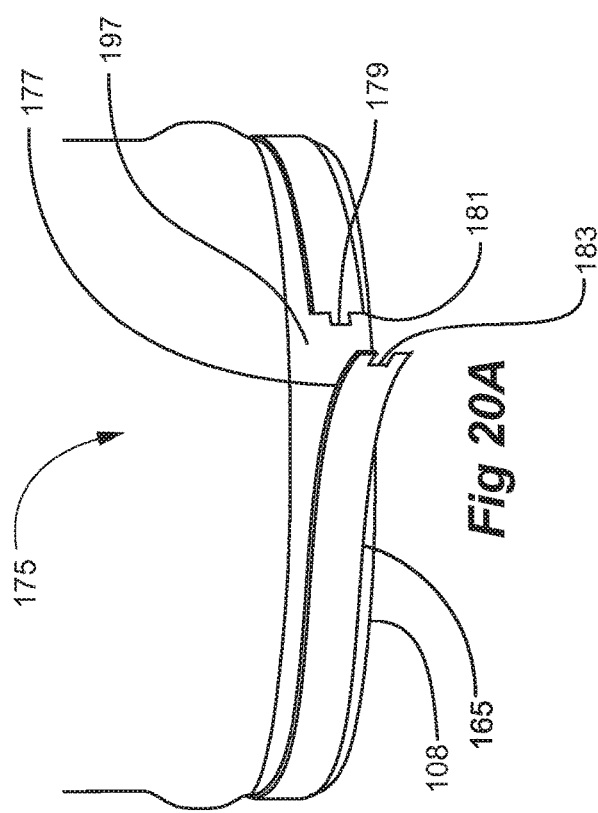
FIG. 20A is a perspective detail of a gasket seal being applied to an upper chamber of a gravity filter system.
Figure 20B:
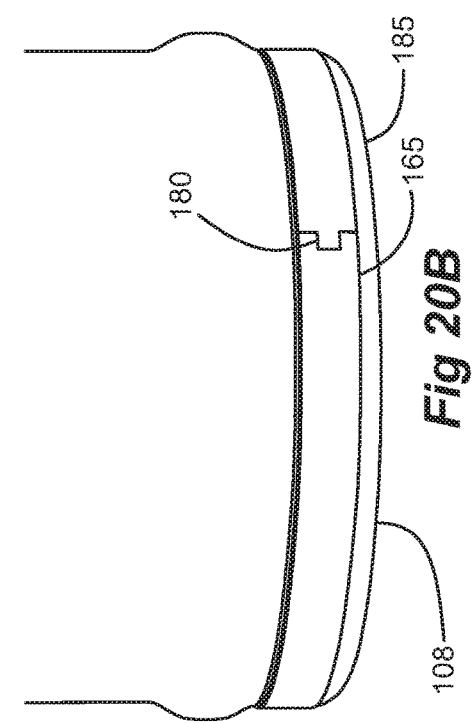
FIG. 20B is a perspective detail of the gasket seal of FIG. 20A after being applied to the upper chamber.

As shown in FIGS. 20A and 20B, annular seal 165 may completely wrap around and be adhesively held to the circumference of the annular portion 197 of the bottom 108 of upper chamber 107, or it might be a continuous ring with no breaks. A mating sealing notch 180, which may include a tongue 179 at one end of the seal and a groove 183 at the other end of the seal, prevents a circumferential gap 189 in FIG. 20D at seal joint 187 from allowing water to escape through the seal assembly joint 187. The horizontal sealing edges 193 of the sealing joint 187 allow for tighter control than the vertical edges 191, 195 of sealing joint 187, eliminating water leakage through gap 189 at seal joint 187. In each case an annular seal 165 seals the interface 115 (FIGS. 19A, B, C, D) between upper chamber 107 and lower chamber 109. Any other pattern or shape of mating interface of the two ends, other than a straight vertical cut, may be used in other implementations.

Figure 21C:
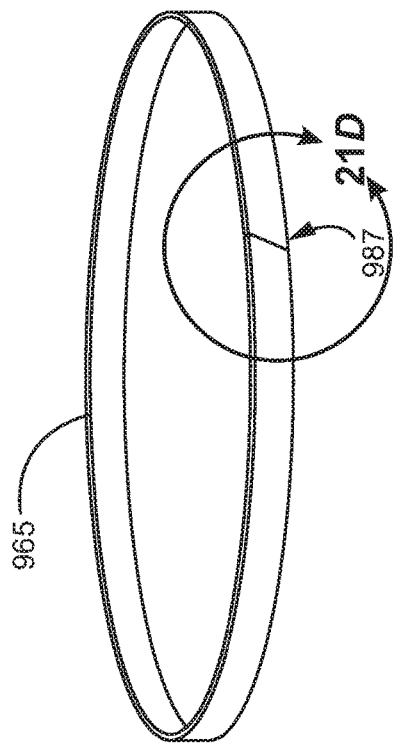
FIG. 21C is a perspective detail of the gasket seal of FIG. 21A.
Figure 21D:
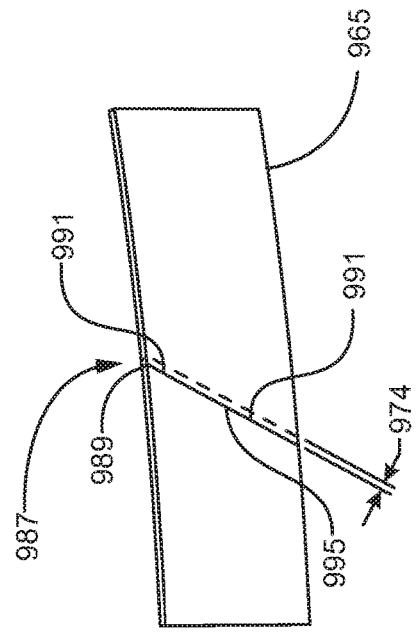
FIG. 21D is a perspective detail view of the gasket seal of FIG. 21C.
Figure 21A:
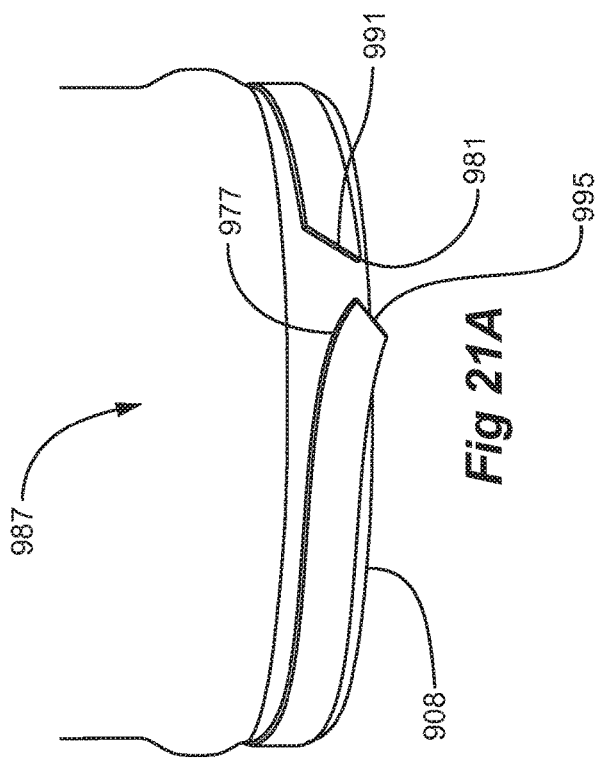
FIG. 21A is a perspective detail of a gasket seal being applied to an upper chamber of a gravity filter system.
Figure 21B:
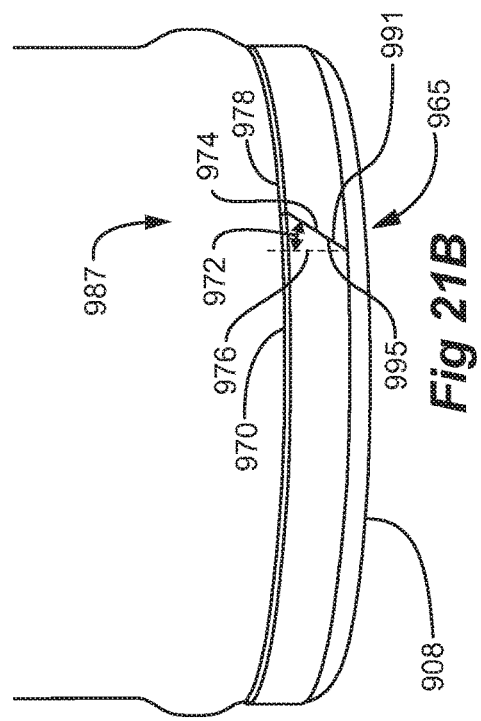
FIG. 21B is a perspective detail of the gasket seal of FIG. 21A after being applied to the upper chamber.

FIGS. 21A, B, C and D show an alternate embodiment in which the annular seal 965 is cut at an angle 972 so that right edge 991 mates exactly with left edge 995. This angle 972 would allow for any needed adjustment to eliminate any gap or overlap that might occur during placement.

Figure 26:
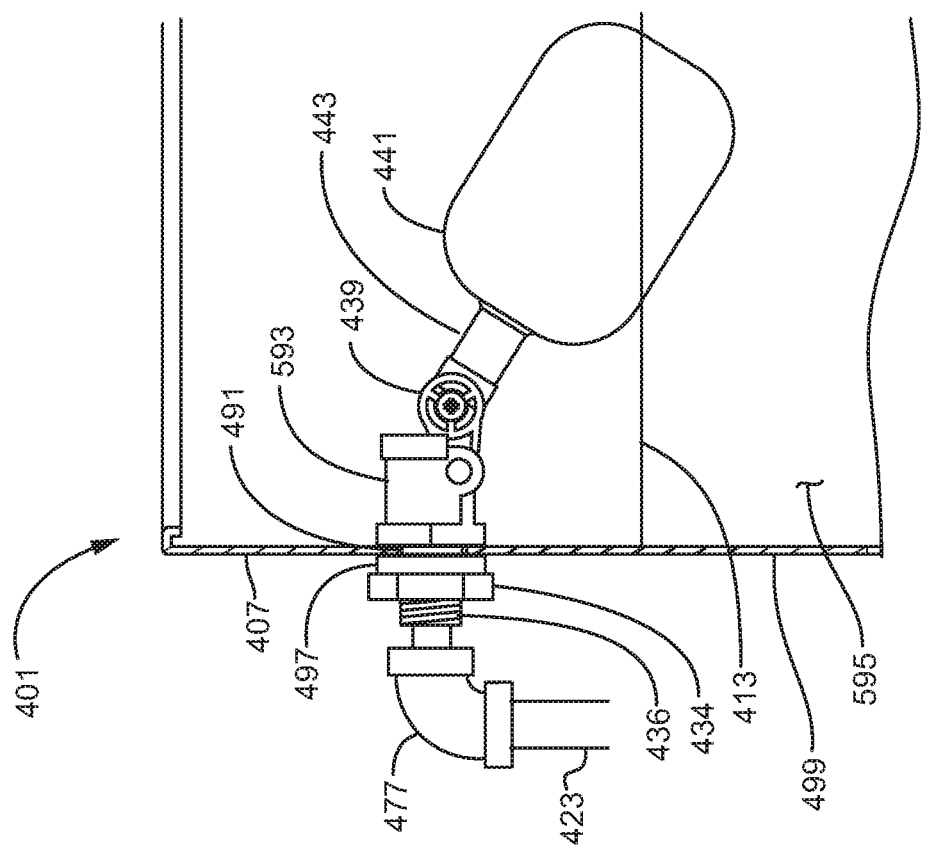
FIG. 26 is a section detail view of the system of FIG. 25 showing the float valve mounted to the sidewall of the upper chamber.

FIGS. 22 and 23 show an alternative embodiment of the connection of the filter system to its off-grid water sources, as seen previously in FIGS. 3 and 4. This embodiment depicts a filter system 401 where a fitting 411 may be connected to an unpurified water container 462 at port 414 sealed by annular seal 416 and secured by jam nut 460 that is threaded onto threaded portion 418 of fitting 411. The unpurified external water feed line 423 may connect to fitting 411, through an off-grid shutoff valve 469, from the outlet port 414 of the off-grid unpurified water container 462. Water feed line 423 may connect to fitting 477 at port 491 of upper chamber 407. Then as shown in FIG. 26, fitting 477 may connect to valve body 593. A jam nut 434 may secure threaded portion 436 of valve body 593 to port 491 and annular seal 497 may seal port 491.

Figure 25:
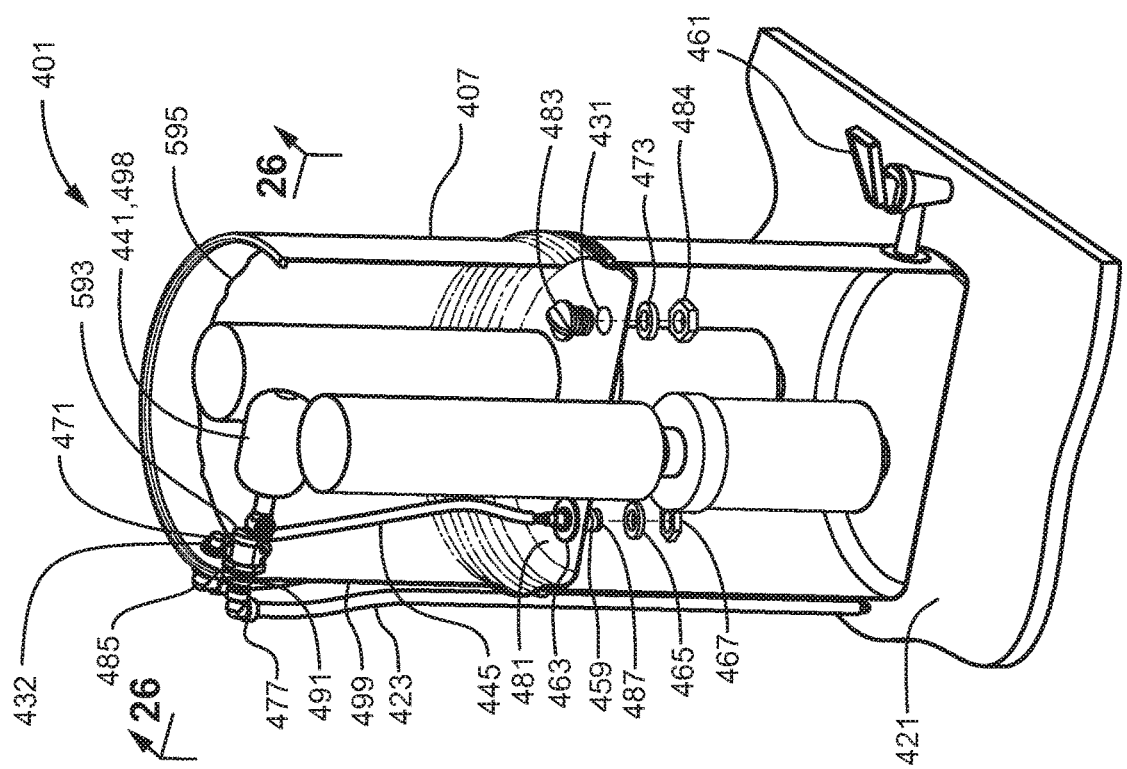
FIG. 25 is a section view of the system of FIG. 24 showing a float valve connected to a sidewall of the upper chamber.
Figure 24:
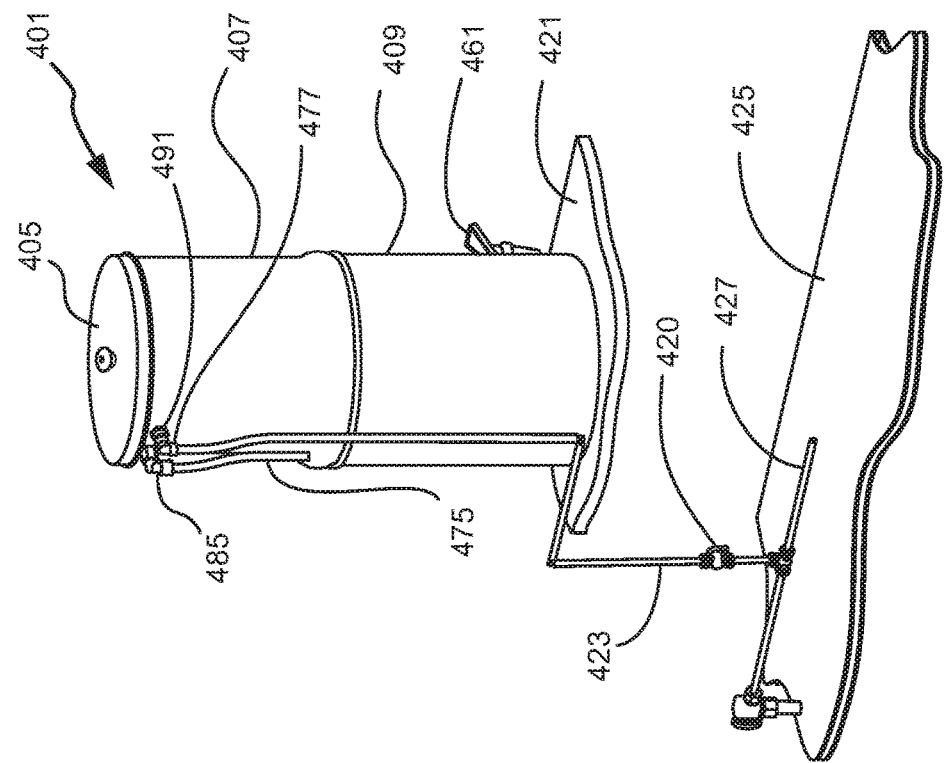
FIG. 24 is a perspective view of a gravity fed water filter system connecting a culinary water line through a sidewall of an upper chamber of the system.

As depicted in FIG. 24, a shut off valve 420 may connect the water pressure line 427 to the external water feed line 423. As shown in FIGS. 25 and 26, the external water feed line 423 continues until it connects to a fitting which may be an elbow 477 which passes through inlet port 491 in the side wall 499 of upper chamber 407 and connects to float valve body 593. In the detail of FIG. 26, annular float valve seal 497 seals port 491 by being placed between the connection of float valve body 593 and fitting 477. Jam nut 434 is secured to threaded end 436 of valve body 593.

FIGS. 25 and 26 also depict the flow of unpurified water 595 through the water feed line 423, which continues through the elbow 477 into valve body 593 and is released into upper chamber 407. Unpurified water 595 continues to fill upper chamber 407 until the upper chamber water level 413 engages float valve bulb 441. The water 595 then may force valve bulb 441 of float valve 443 to raise, until the valve body 593 attenuates flow of unpurified water 595 into upper chamber 407.

Figure 27:
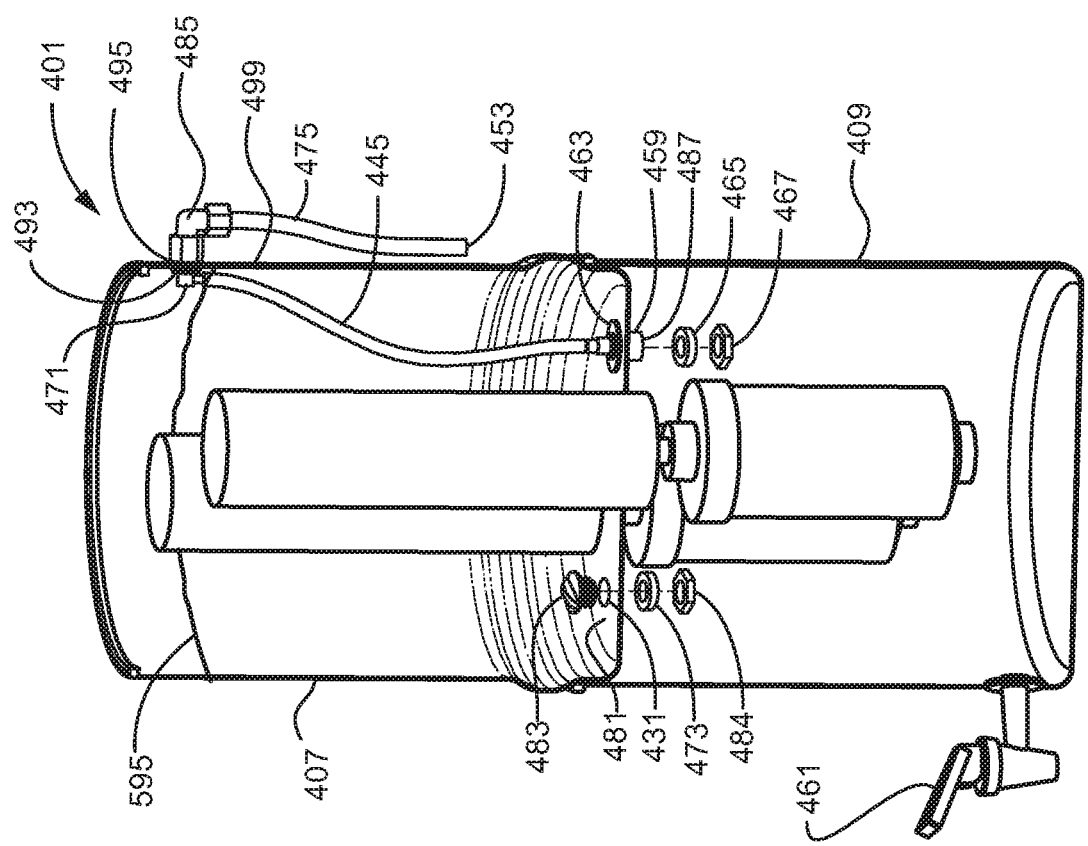
FIG. 27 is a section perspective view of a gravity fed water filter system showing a vent exiting a sidewall of the upper chamber.

This same embodiment shown also in FIG. 27 depicts the vent stack 445 which is attached to a bulkhead fitting 463 and extends through orifice 431 in floor 481 of upper chamber 407. An annular seal 465 may be placed on threaded portion 459 of bulkhead fitting 463. Jam nut 467 is then tightened onto threaded portion 459. The air and water in lower chamber 409 can then freely flow through the inlet port 487 on the underside of the bulkhead fitting 463 and up through the vent stack 445. The upper end of vent stack 445 connects to an elbow 471 that exits through outlet port 495 of side wall 499 in upper chamber 407. An annular vent seal 493 seals the vent outlet port 495 of side wall 499 in upper chamber 407. An elbow 485 may connect the vent on the outside of upper chamber 407 to optional down spout 475 and vents out to the open air at the vent exit 453 as shown in FIG. 27, thus creating equilibrium in chamber 409 with the ambient air pressure outside the filter system 401. Plugs 483, annular seals 473 and jam nuts 484 are used to fill unused orifices 431 where needed to prevent unpurified water in upper chamber 407 from entering and contaminating lower chamber 409.

FIGS. 28 and 29 show how a third chamber embodiment 600/700, may be implemented either in place of the off-grid unpurified water container 131, previously depicted in FIG. 4, or may act as the purified water container 221, previously depicted in FIG. 10.

Figure 30:
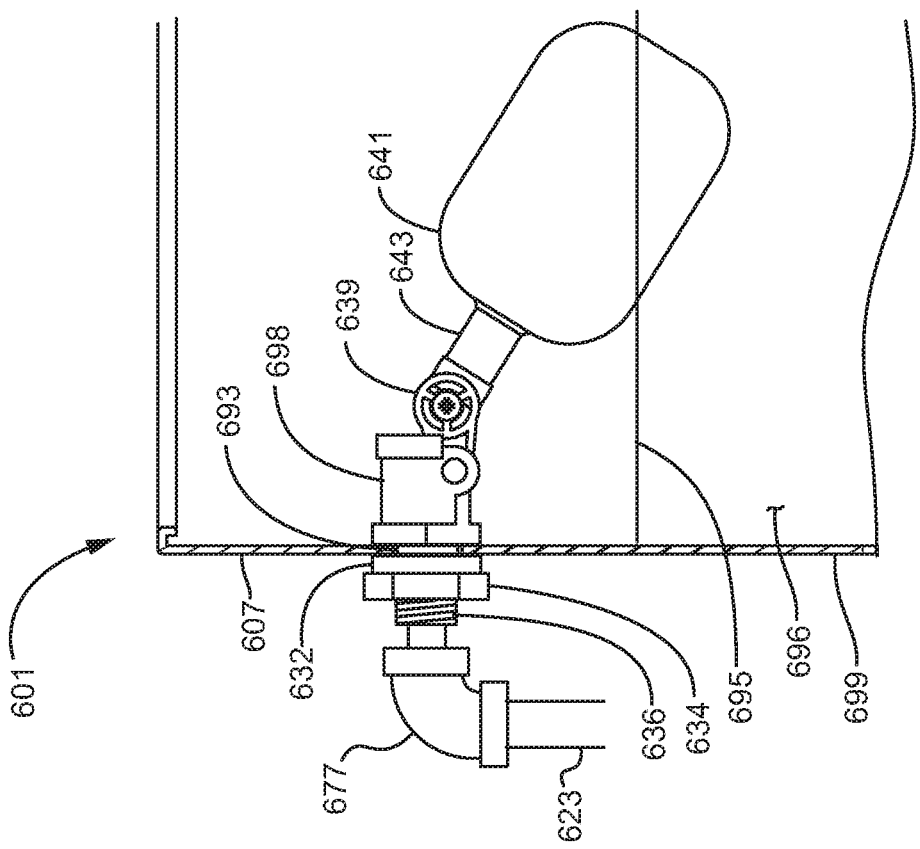
FIG. 30 is a detail section view of an upper chamber of the system of FIG. 28.

FIGS. 28 and 30 depict an integrated purified water containment system 600 wherein the purified water container 221 as shown previously in FIG. 10 is alternatively designed directly into the filter system 600 as an additional chamber 610/710, doubling the capacity of purified water of the current gravity filtration systems in a more aesthetically pleasing alternative than the container 221 previously shown in FIG. 10. In this embodiment the filters 611 are inserted into the orifices 631 in the base 681 of the upper chamber 607, and any remaining open orifices 631 are plugged with plug 683, seal 673 and jam nut 684. The orifices 620 in floor 622 of the new middle chamber 610 are left open to allow purified water 654 to flow freely from the new middle chamber 610 to the lower chamber 609, which doubles the filter system's capacity for available purified water 654.

The water feed line 623 may connect from either the outlet port 414 (FIGS. 22 and 23), through a shutoff valve 469 of the off grid water container 462, or the water pressure line 427 (FIG. 24) through a shutoff valve 420 through feed line 623 (FIG. 28), to fitting or elbow 677. The water flows through inlet port 693 in the side wall 699 of upper chamber 607 into a float valve body 698. Shown in the detail of FIG. 30, an annular seal 632 and jam nut 634 may be secured to threaded end 636 of valve body 698 through inlet port 693. Unpurified water 696 flows through water line 623 through elbow 677 into valve body 698 and is released into upper chamber 607. Unpurified water 696 continues to fill upper chamber 607 until the upper chamber water level 695 engages float valve bulb 641. The water 696 then may force valve bulb 641 of float valve 643 to raise, pivoting bulb 641 about valve pivot 639 until the valve body 698 attenuates flow of unpurified water 696 into upper chamber 607.

This embodiment also allows for the vent stack 645 seen in FIG. 28, which is attached to a bulkhead fitting 663 and extends through an orifice 631. A seal 665 and jam nut 667 in floor 681 of upper chamber 607 are secured to threaded feature of the bulkhead fitting 663, allowing the vent stack to open out into middle chamber 610 through a vent inlet port 687 on the underside of the bulkhead fitting 663. The upper end of vent stack 645 connects to an elbow 671 that exits through outlet port 697 of side wall 699 in upper chamber 607. An annular vent seal 694 seals the vent outlet port 697 of side wall 699 in upper chamber 607 as shown in FIG. 28. Elbow 685 connects the vent on the outside of upper chamber 607 to optional down spout 675 and vents out to the open air at the vent exit 653.

Figure 31:
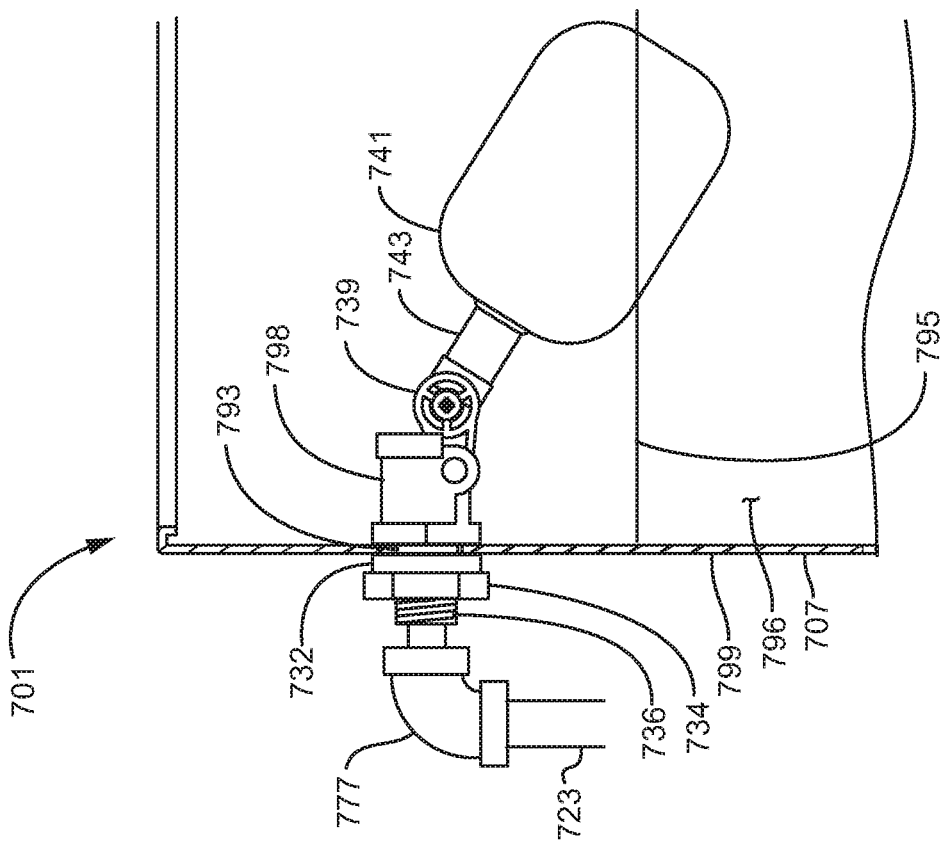
FIG. 31 is a detail section view of an upper chamber of the system of FIG. 29.

FIGS. 29 and 31 depict an integrated off grid water containment system 700 wherein an unpurified water container 131, such as the one shown in FIG. 4, is designed directly into the filter system 700, in a more aesthetically pleasing alternative, as an additional chamber, doubling the capacity of unpurified water of the current gravity filtration systems. The water feed line 723 may connect from either the outlet port 414 (FIG. 22) through a shutoff valve 469 of the off grid water container 462, or a water pressure line 427 (FIG. 24). As detailed in FIG. 31, the water feed line 723 then connects to an elbow 777 at inlet port 793 in the side wall 799 of upper chamber 707 into a float valve body 798. An annular seal 732 seals port 793 in the side wall 799 of upper chamber 707. Jam nut 734 is secured to threaded end 736 of valve body 798. Unpurified water 796 goes through water line 723 through the elbow 777 into valve body 798 and is released into upper chamber 707. Unpurified water 796 continues to fill upper chamber 707 until the upper chamber water level 795 engages float valve bulb 741. The water level 795 then may force valve bulb 741 of float valve 743 to raise, pivoting bulb 741 about valve pivot 739 until the valve body 798 attenuates flow of unpurified water 796 into upper chamber 707.

The embodiment of FIG. 29 is like that of FIG. 28 except that floor 722 of middle chamber 710 separates the unpurified water 796 stored in the upper two chambers 707 and 710 from the purified water 716 stored in the lower chamber 709. Note that since middle chambers 610/710 would be stackable, as many as desired may be added to this new, more versatile water filter system 700.

The vent for this embodiment is shown in FIG. 29, beginning with a threaded inlet port 787 in lower chamber 709 on the underside of the bulkhead fitting 763, connected by a seal 765 and jam nut 767 which passes through an orifice 720 in floor 722 of the new middle chamber 710, and may extend through an unsealed orifice 731 in the floor 781 of the upper chamber 707. The upper end of vent stack 745 connects to an elbow 771 that exits through outlet port 794 of side wall 799 in upper chamber 707. An annular vent seal 794 seals the vent outlet port 797 of side wall 799 in upper chamber 707. Elbow 785 connects the vent on the outside of upper chamber 707 to optional down spout 775 and vents out to the open air at the vent exit 753.

Figure 32:
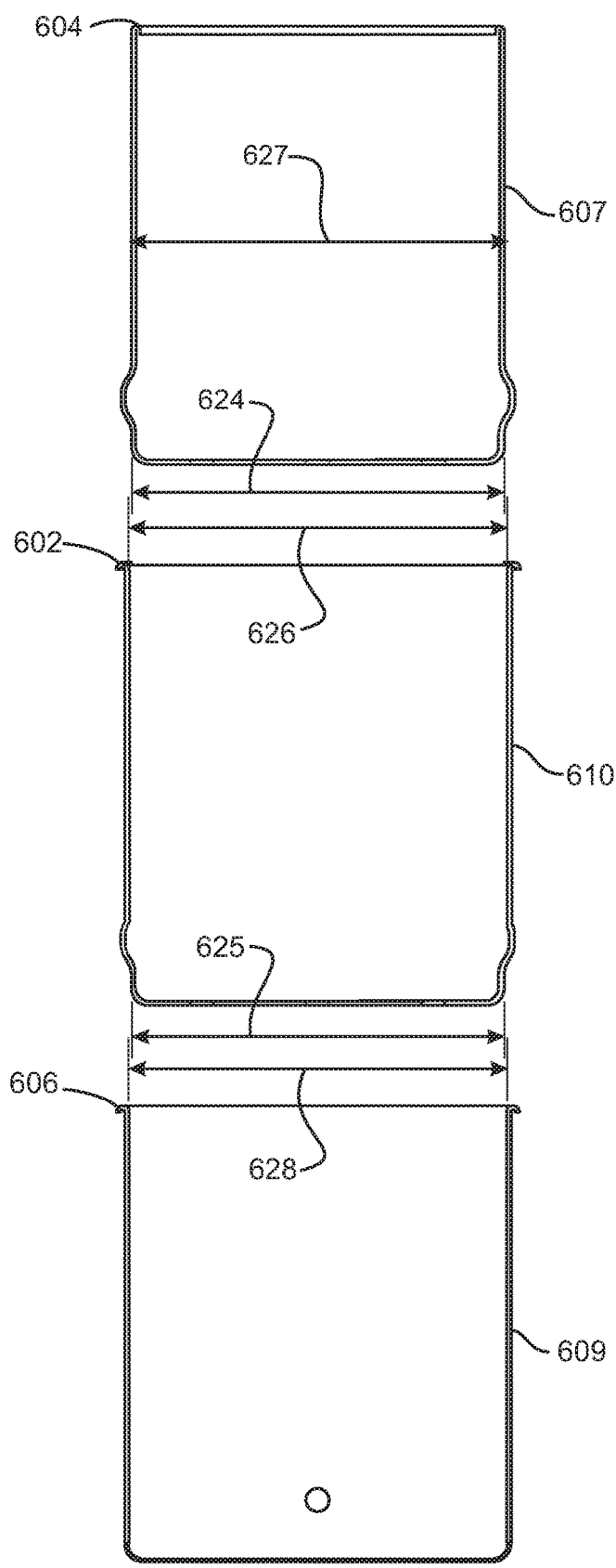
FIG. 32 is a front section exploded view of a gravity filter with an added mid-chamber.
Figure 33:
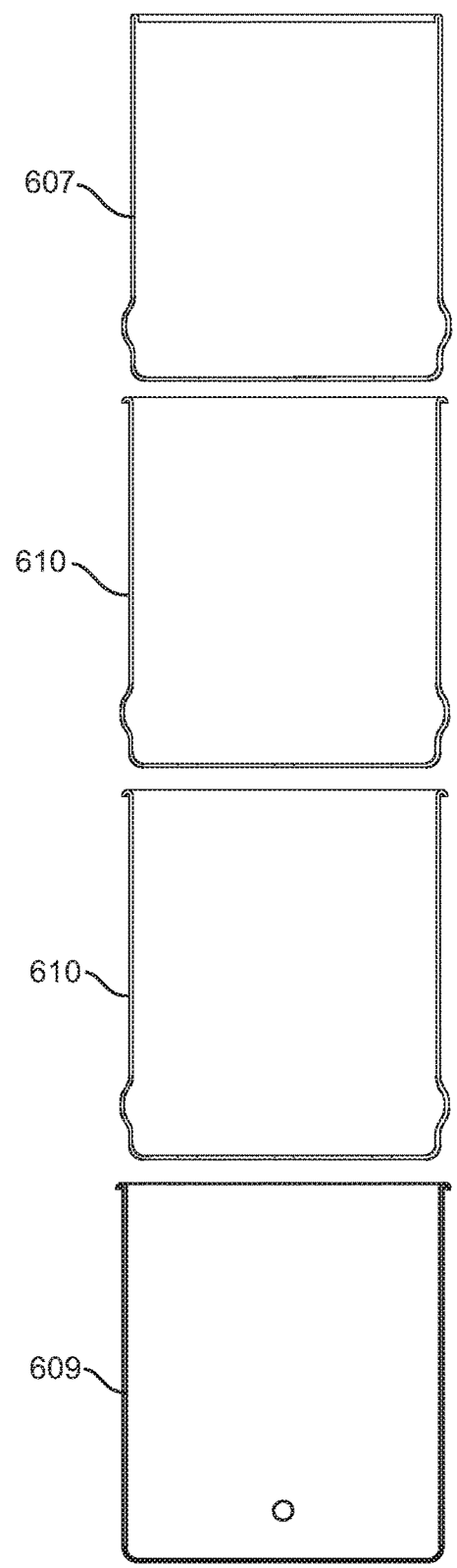
FIG. 33 is a front section exploded view of a gravity filter with multiple mid-chambers added between upper and lower storage containers.

FIGS. 32 and 33 apply to both the 600 and 700 embodiments. FIG. 32 shows construction of mid-chamber 610/710. The lip 602 of mid chamber 610/710 turns outward as opposed to the lip 604 of upper chamber 607, which turns inward. This inside diameter 626 of mid-chamber 610/710 allows mid-chamber 610/710 to receive either the bottom outside diameter 624 of upper chamber 607, or to receive the bottom outside diameter 625 of another mid-chamber 610/710. The outside bottom diameter 625 of mid-chamber 610/710 may be designed to slip into the top inside diameter 628 of lower chamber 609, or the top inside diameter 626 of another mid-chamber 610/710. This allows for multiple mid-chambers 610/710 to be stacked one upon another as many as desired, between upper chamber 607 and lower chamber 609, which can be used either as additional unpurified or purified water chambers as shown in FIG. 33.

Figure 35:
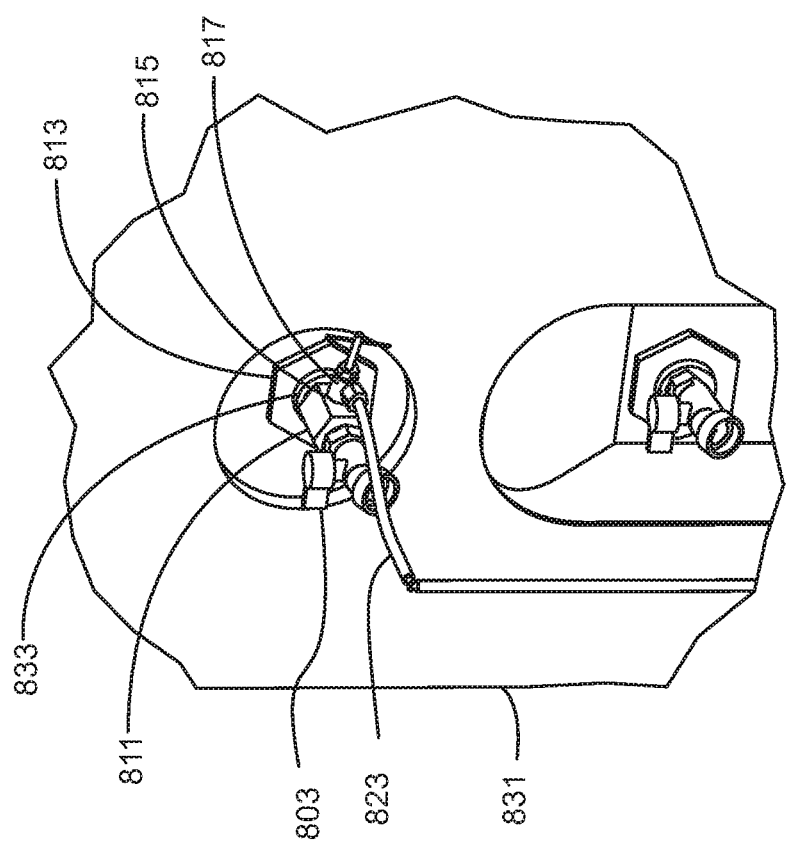
FIG. 35 is a detail view of a diverting faucet adapter of the system of FIG. 34.
Figure 34:
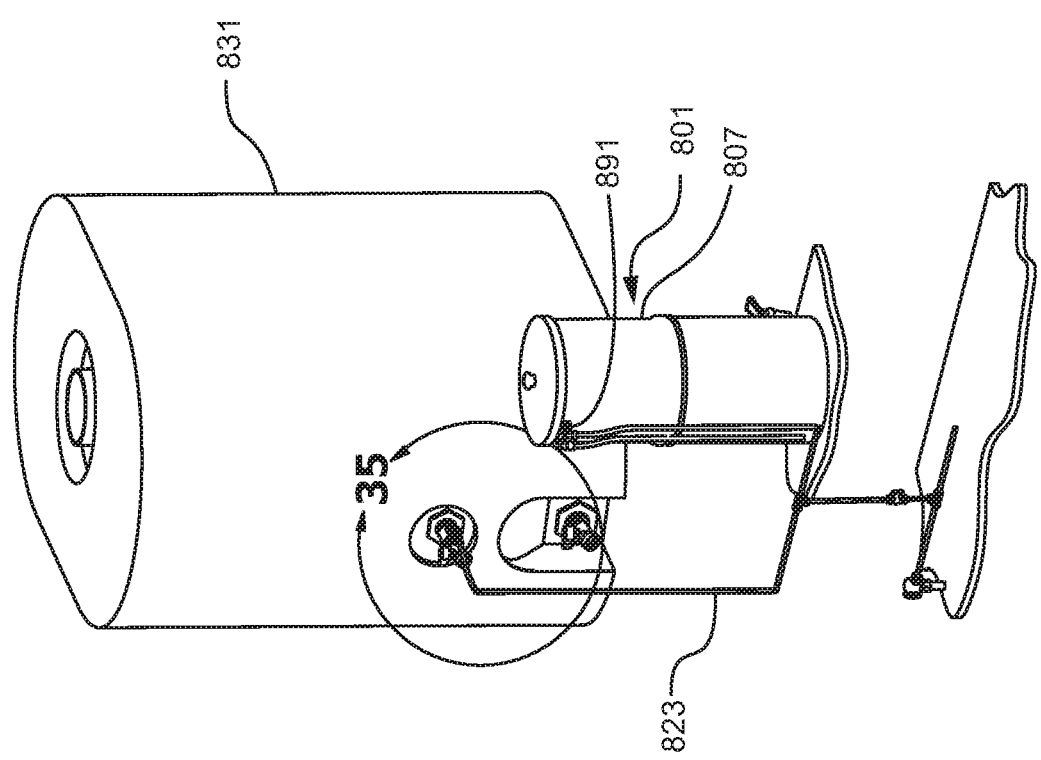
FIG. 34 is a perspective view of a gravity fed water filter system connecting to a large unpurified water storage container.
Figure 36:
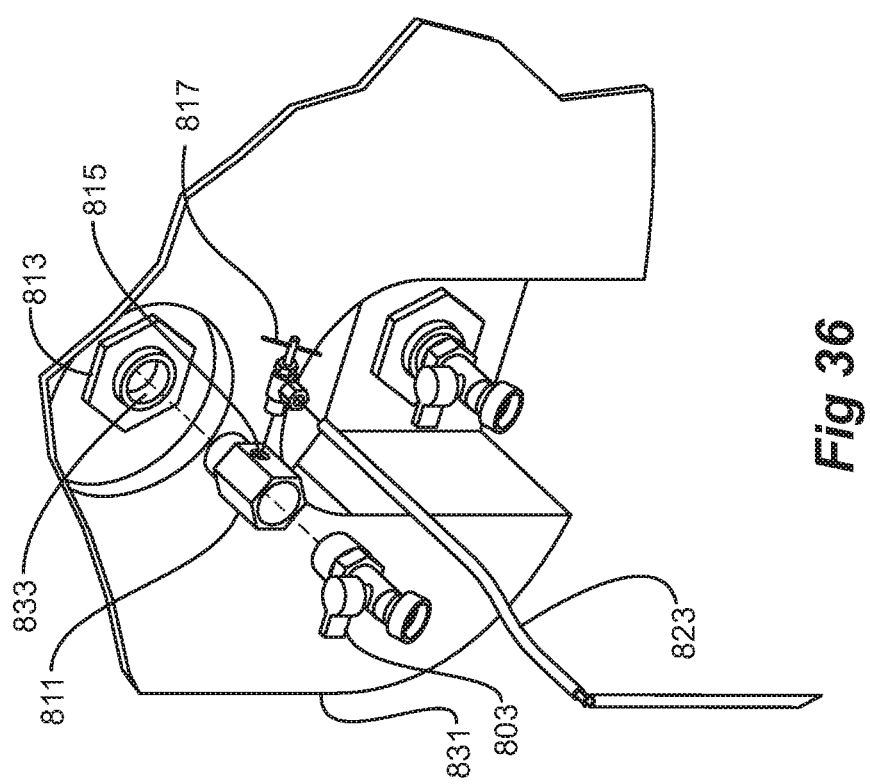
FIG. 36 is an exploded view of the diverting faucet adapter of FIG. 35.

FIGS. 34 and 35 and exploded detail FIG. 36 show water filter system 801, which may be attached to a large water storage tank 831 at storage tank port 833 with the use of a spigot adapter 811 that attaches to port fitting 813. This adapter may be attached to a spout or spigot 803 which may dispense water from storage container 831. A side port 815 in the spigot adapter 811 may connect to a shutoff valve 817 to allow manual shutoff of water in line 823. This water feed line 823 may then connect to water filter system 801 in upper chamber 807 at an inlet port 891. This allows the user to connect the water filter system to large water storage containers 831 which may consist of any size and shape. Storage tank port 833 may dispense water through its standard spout 803 and still feed the water inlet line 823 by way of side port 815 in spigot adapter 811.

In places where the description above refers to specific embodiments of filter systems and related methods, one or more or many modifications may be made without departing from the spirit and scope thereof. Details of any specific embodiment/implementation described herein may, wherever possible, be applied to any other specific implementation/embodiment described herein.

What is claimed is:

1. A gravity water filter system, comprising:
an upper chamber removably coupled with a lower chamber;
a water line removably attached to the upper chamber for delivering unfiltered water to said upper chamber from a water source;
a float valve within said upper chamber for controlling a flow of unfiltered water from the water line to said upper chamber, said float valve being fluidically connected to said water line to prevent unfiltered water from overflowing out of the upper chamber;
a filter medium located at least partly within one of the upper chamber and the lower chamber and arranged for filtering water as it passes through said filter medium from the upper chamber to the lower chamber by gravity, producing filtered water;
a spout generally located at the bottom of the lower chamber for allowing filtered water to be withdrawn from the lower chamber;
a bulkhead fitting in the lower chamber; and
an air vent stack connected to said bulkhead fitting and extending through said upper chamber and above a water line of the upper chamber, the air vent stack fluidically coupled with a fitting passing through a sidewall of said upper chamber, the air vent stack venting an interior of the lower chamber to ambient air external of the filter system to maintain ambient air pressure within the lower chamber.

2. A gravity water filter system as recited in claim 1, further comprising:
a float valve within said lower chamber for controlling the filtered water level therein.

3. A gravity water filter system as recited in claim 1, wherein the water source is a pressurized water line.

4. A gravity water filter system as recited in claim 1, wherein the water source is an off-grid unfiltered water container.

* * * * *

UNITED STATES PATENT AND TRADEMARK OFFICE
CERTIFICATE OF CORRECTION

PATENT NO. : 10,905,976 B2  
APPLICATION NO. : 15/942081  
DATED : February 2, 2021  
INVENTOR(S) : Valdean Allen Johnson and Celia Roberts Johnson Page 1 of 1

It is certified that error appears in the above-identified patent and that said Letters Patent is hereby corrected as shown below:

In the Specification

Column 6, Line 6, replace "float vavle bracket" with -float valve bracket-.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*